United States Patent
Karaoguz et al.

(10) Patent No.: US 8,948,309 B2
(45) Date of Patent: *Feb. 3, 2015

(54) METHOD AND SYSTEM FOR REDUNDANCY-BASED DECODING OF VIDEO CONTENT IN A WIRELESS SYSTEM

(75) Inventors: Jeyhan Karaoguz, Irvine, CA (US); Hooman Honary, Newport Coast, CA (US); Nambirajan Seshadri, Irvine, CA (US); Jason A. Trachewsky, Menlo Park, CA (US); Arie Heiman, Rannana (IL)

(73) Assignee: Broadcom Corporation, Irvine, CA (US)

( * ) Notice: Subject to any disclaimer, the term of this patent is extended or adjusted under 35 U.S.C. 154(b) by 774 days.

This patent is subject to a terminal disclaimer.

(21) Appl. No.: 11/686,876

(22) Filed: Mar. 15, 2007

(65) Prior Publication Data

US 2008/0219381 A1 Sep. 11, 2008

Related U.S. Application Data

(63) Continuation-in-part of application No. 11/189,634, filed on Jul. 26, 2005, now Pat. No. 7,706,481.

(60) Provisional application No. 60/893,299, filed on Mar. 6, 2007.

(51) Int. Cl.
*H03K 9/00* (2006.01)
*H04N 19/46* (2014.01)
(Continued)

(52) U.S. Cl.
CPC ........ *H04N 19/00545* (2013.01); *H04L 1/0054* (2013.01); *H04N 19/00533* (2013.01); *H04N 19/00078* (2013.01); *H04L 1/1671* (2013.01); *H04L 1/1819* (2013.01)
USPC ........................................................ 375/316

(58) Field of Classification Search
CPC ... H04L 1/0054; H04L 1/1671; H04L 1/1819; H04N 19/00545; H04N 19/00533; H04N 19/00078
USPC ........................................................ 376/316
See application file for complete search history.

(56) References Cited

U.S. PATENT DOCUMENTS 5,231,492 A * 7/1993 Dangi et al. ................ 348/14.12
5,793,413 A * 8/1998 Hylton et al. ................... 725/81
(Continued)

FOREIGN PATENT DOCUMENTS

CN 1744475 3/2006
KR 10-2002-0049790 A 6/2002
(Continued)

OTHER PUBLICATIONS

Yasuda, "MPEG2 video decoder and AC-3 audio decoder LSIs for DVD player", IEEE Transactions on Consumer Electronics, vol. 43, Issue 3, Aug. 1997 pp. 462-468.*
(Continued)

*Primary Examiner* — Juan A Torres
(74) *Attorney, Agent, or Firm* — Garlick & Markison; Bruce E. Garlick

(57) ABSTRACT

Aspects of a method and system for redundancy-based decoding of video content in a wireless system are provided. A wireless receiver may determine whether a received multimedia data stream comprises video content and may select a redundancy-based decoder when video content is detected. The wireless receiver may be a wireless local area network (WLAN) receiver or a cellular receiver. Video content may be indicated by at least one flag in a preamble or a reserved field of the received multimedia data. The redundancy-based decoder may be a Viterbi decoder. The wireless receiver may enable a standard Viterbi decoder to decode portions of the multimedia data that do not comprise video content. The wireless receiver may generate at least one signal to select the redundancy-based decoder or the standard Viterbi decoder.

24 Claims, 14 Drawing Sheets

(51) Int. Cl.
*H04L 1/00* (2006.01)
*H04N 19/44* (2014.01)
*H04N 19/12* (2014.01)
*H04L 1/16* (2006.01)
*H04L 1/18* (2006.01)

(56) References Cited

U.S. PATENT DOCUMENTS

| | | | | |
|---|---|---|---|---|
| 6,094,465 | A * | 7/2000 | Stein et al. | 375/346 |
| 6,553,145 | B1 * | 4/2003 | Kang et al. | 382/239 |
| 6,694,474 | B2 * | 2/2004 | Ramprashad et al. | 714/755 |
| 2001/0022782 | A1 * | 9/2001 | Steudle | 370/335 |
| 2001/0050967 | A1 * | 12/2001 | Kuzminskiy et al. | 375/350 |
| 2005/0238330 | A1 * | 10/2005 | Abe et al. | 386/98 |
| 2005/0238331 | A1 * | 10/2005 | Abe et al. | 386/98 |
| 2005/0286509 | A1 * | 12/2005 | Iwamura | 370/381 |
| 2006/0039510 | A1 * | 2/2006 | Heiman et al. | 375/341 |
| 2006/0050813 | A1 * | 3/2006 | Heiman et al. | 375/341 |
| 2006/0251192 | A1 * | 11/2006 | Heiman et al. | 375/341 |
| 2007/0067472 | A1 * | 3/2007 | Maertens et al. | 709/230 |
| 2008/0013562 | A1 * | 1/2008 | Fujinami et al. | 370/429 |
| 2009/0116814 | A1 * | 5/2009 | Morohashi et al. | 386/65 |

FOREIGN PATENT DOCUMENTS

| | | |
|---|---|---|
| WO | 2006/099223 A2 | 9/2006 |
| WO | 2006/119436 A2 | 11/2006 |

OTHER PUBLICATIONS

European Patent Office; European Search Report, EP Application No. 08003288.1; Nov. 29, 2012; 6 pages.

Schurgers, C., et al., "Voice Over Wireless Internet: Performance Interaction of Signal Processing Algorithms and Network Protocols," 1999 IEEE 49th Vehicular Technology Conference, vol. 3, pp. 1935-1939.

* cited by examiner

METHOD AND SYSTEM FOR REDUNDANCY-BASED DECODING OF VIDEO CONTENT IN A WIRELESS SYSTEM

CROSS-REFERENCE TO RELATED APPLICATIONS/INCORPORATION BY REFERENCE

The present application is a continuation-in-part of U.S. patent application Ser. No. 11/189,634, filed Jul. 26, 2005 now U.S. Pat. No. 7,706,481, and also makes reference to, claims priority to, and claims the benefit of U.S. Provisional Application Ser. No. 60/893,299 filed Mar. 6, 2007.

This patent application makes reference to:
U.S. patent application Ser. No. 11/189,509 filed on Jul. 26, 2005;
U.S. patent application Ser. No. 11/189,634 filed on Jul. 26, 2005;
U.S. patent application Ser. No. 11/492,390 filed on Jul. 25, 2006; and
U.S. patent application Ser. No. 11/686,882 filed on Mar. 15, 2007.

Each of the above stated applications is hereby incorporated by reference in its entirety.

FIELD OF THE INVENTION

Certain embodiments of the invention relate to video signal handling for wireless communications. More specifically, certain embodiments of the invention relate to a method and system for redundancy-based decoding of video content in a wireless system.

BACKGROUND OF THE INVENTION

In some conventional receivers, improvements may require extensive system modifications that may be very costly and, in some cases, may even be impractical. Determining the right approach to achieve design improvements may depend on the optimization of a receiver system to a particular modulation type and/or to the various kinds of noises that may be introduced by a transmission channel. For example, the optimization of a receiver system may be based on whether the signals being received, generally in the form of successive symbols or information bits, are interdependent. Signals received from, for example, a convolutional encoder, may be interdependent signals, that is, signals with memory. In this regard, a convolutional encoder may generate non-return-to-zero inverted (NRZI) or continuous-phase modulation (CPM), which is generally based on a finite state machine operation One method or algorithm for signal detection in a receiver system that decodes convolutional encoded data is maximum-likelihood sequence detection or estimation (MLSE). The MLSE is an algorithm that performs soft decisions while searching for a sequence that minimizes a distance metric in a trellis that characterizes the memory or interdependence of the transmitted signal. In this regard, an operation based on the Viterbi algorithm may be utilized to reduce the number of sequences in the trellis search when new signals are received. Another method or algorithm for signal detection of convolutional encoded data that makes symbol-by-symbol decisions is maximum a posteriori probability (MAP). The optimization of the MAP algorithm is based on minimizing the probability of a symbol error. In many instances, the MAP algorithm may be difficult to implement because of its computational complexity.

Improvements in the design and implementation of optimized receivers for decoding convolutional encoded data may require modifications to the application of the MLSE algorithm, the Viterbi algorithm, and/or the MAP algorithm in accordance with the modulation method utilized in signal transmission.

In some instances, such as in wireless local area networks (WLAN) or in cellular networks, the design and implementation of optimized wireless receivers may be based on the ability of the receiver to improve the decoding of multiple types of content. For example, in multimedia applications, a WLAN-enabled or cellular receiver may be utilized for decoding video content that may comprise convolutional encoded information while enabling decoding of audio and/or data content that may also be received from the network. The overall performance of the receiver may therefore depend on the ability of the receiver to optimize the decoding of audio/voice content, video content, and/or data content.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for redundancy-based decoding of video content in a wireless system, substantially as shown in and/or described in accordance with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for redundancy-based decoding of video content in a wireless system. Aspects of the invention may comprise a wireless receiver that may determine whether a received multimedia data stream comprises video content and may select a redundancy-based decoder when video content is detected. The wireless receiver may be a WLAN receiver or a cellular receiver. Video content may be indicated by at least one flag in a preamble or a reserved field of the received multimedia data. The redundancy-based decoder may be a Viterbi decoder. The redundancy-based decoder may be selected to decode a determined number of received packets in the multimedia data stream. The wireless receiver may enable a standard Viterbi decoder to decode portions of the multimedia data that do not comprise video content. The wireless receiver may generate at least one signal to select the redundancy-based decoder or the standard Viterbi decoder.

Figure 1A:
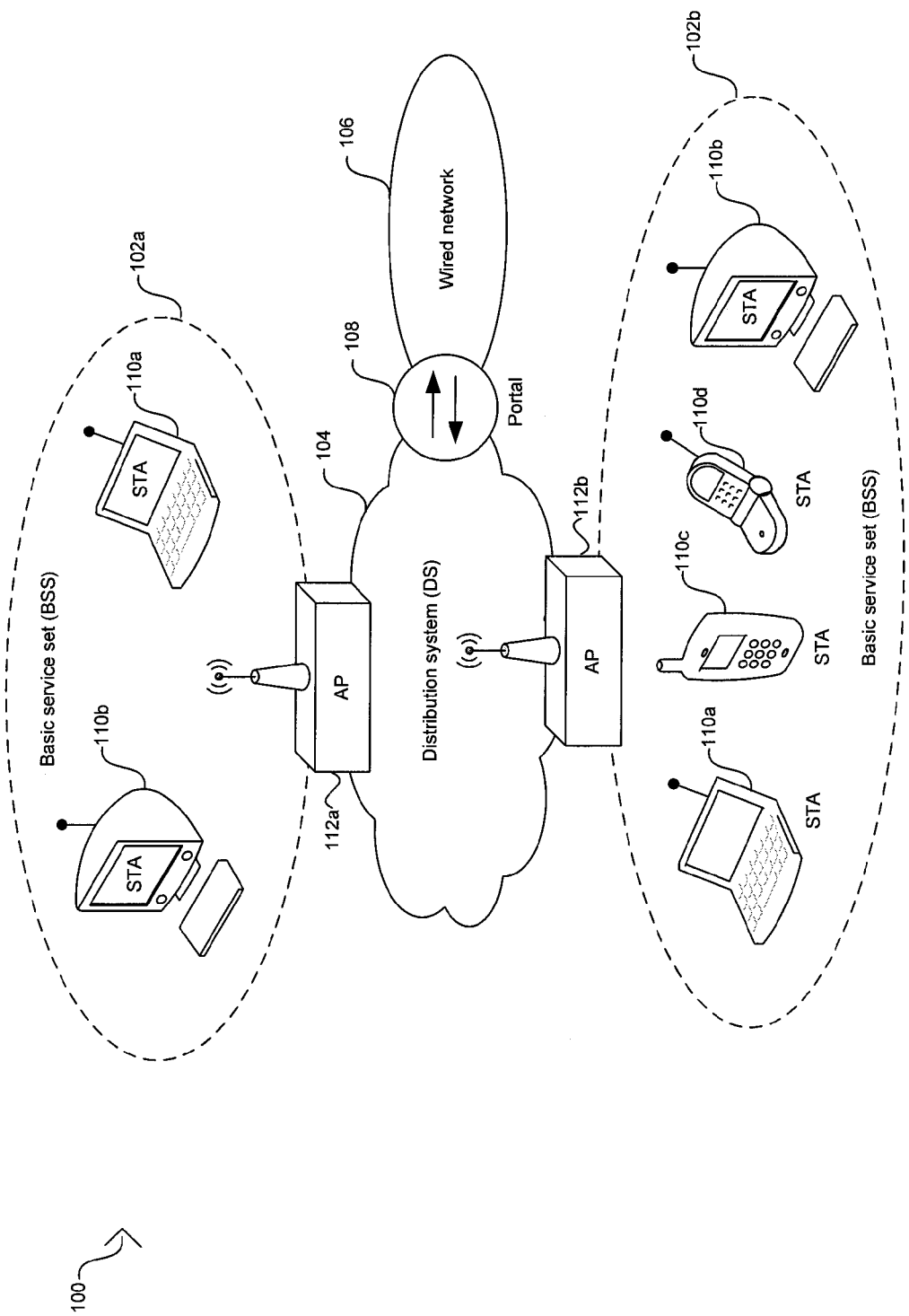
FIG. 1A is a block diagram illustrating an exemplary WLAN infrastructure network comprising basic service sets (BSSs) for communicating video content to a wireless device, in accordance with an embodiment of the invention.

FIG. 1A is a block diagram illustrating an exemplary WLAN infrastructure network comprising basic service sets (BSSs) for communicating video content to a wireless device, in accordance with an embodiment of the invention. Referring to FIG. 1A, the exemplary WLAN infrastructure network 100 shown may comprise a first BSS 102a, a second BSS 102b, a distribution system (DS) 104, a wired network 106, a portal 108, a first access point (AP) 112a, a second AP 102b, and a plurality of WLAN stations (STAs). The BSSs 102a and 102b may represent a fundamental building block of the IEEE 802.11 (WLAN) architecture and may be defined as a group of stations (STAs) that are under the direct control of a single coordination function. In some instances, the WLAN infrastructure network 100 may correspond, for example, to an infrastructure mode of operation of the IEEE 802.11b standard for high rate WLANs also known as WiFi.

The geographical area covered by a BSS is known as the basic service area (BSA). The DS 104 may be utilized to integrate the BSSs 102a and 102b and may comprise suitable logic, circuitry, and/or code that may enable operation as a backbone network that is responsible for Medium Access Control (MAC) level transport in the WLAN infrastructure network 100. The DS 104, as specified by the IEEE 802.11 standard, is implementation independent. For example, the DS 104 may be implemented utilizing IEEE 802.3 Ethernet Local Area Network (LAN), IEEE 802.4 token bus LAN, IEEE 802.5 token ring LAN, Fiber Distributed Data Interface (FDDI) Metropolitan Area Network (MAN), or another IEEE 802.11 wireless medium. The DS 104 may be implemented utilizing the same physical medium as either the first BSS 102a or the second BSS 102b. However, the DS 104 is logically different from the BSSs and may be utilized only to transfer packets between the BSSs and/or to transfer packets between the BSSs and the wired network 106.

The wired network 106 may comprise suitable logic, circuitry, and/or code that may be enable providing wired networking operations. The wired network 106 may be accessed from the WLAN infrastructure network 100 via the portal 108. The portal 108 may comprise suitable logic, circuitry, and/or code that may enable integrating the WLAN infrastructure network 100 with non-IEEE 802.11 networks. Moreover, the portal 108 may also be adapted to perform the functional operations of a bridge, such as range extension and/or translation between different frame formats, in order to integrate the WLAN infrastructure network 100 with IEEE 802.11-based networks.

The APs 112a and 112b may comprise suitable logic, circuitry, and/or code that may enable range extension of the WLAN infrastructure network 100 by providing the integration points necessary for network connectivity between the BSSs. The stations 110a, 110b, 110c, and 110d associated with the APs 112a and 112b may correspond to wireless devices, such as WLAN-enabled terminals, for example, that may comprise suitable logic, circuitry, and/or code that may enable communication to the WLAN infrastructure network 100 via the APs. The STA 110a, STA 110c, and STA 110d shown may correspond to mobile wireless stations or terminals within the BSS. For example, the STA 110a may be a laptop computer, the STA 110c may be a smart phone, and the STA 110d may be a mobile phone. The STA 110b shown may be a desktop computer and may correspond to a fixed or stationary wireless station or terminal within the BSS. Each BSS may comprise a plurality of access points and/or mobile and/or fixed wireless stations and need not be limited to the exemplary implementation shown in FIG. 1A.

In operation, the STAs 110a, 110b, 110c, and 110d may transmit and/or receive packets of information via the APs 102a and 102b. The APs 102a and 102b may enable the stations to communicate with other stations within the same BSS or with stations in a different BSS via the DS 104, for example. The stations may also communicate with the wired network 106 via the portal 108. In some applications, such as in voice-over-internet protocol (VoIP), the packets communicated may comprise audio and/or voice content. In other applications, such as in multimedia applications, the packets communicated may comprise audio/voice content, video content, and/or data content, for example. Voice content may refer to speech communication such as telephone conversations, for example, while audio content may refer to music and/or speech content, for example. In this regard, the STAs 110a, 110b, 110c, and 110d may be enabled to process, for example, decode and/or encode, packets comprising at least one type of information content. The APs may enable indicating to the STAs when a packet and/or stream of packets comprises either audio/voice content, video content, and/or data content by, for example, setting at least one flag in a preamble or header of the packet or by indicating priorities associated with quality of service requirements for voice and/or video applications.

Figure 1B:
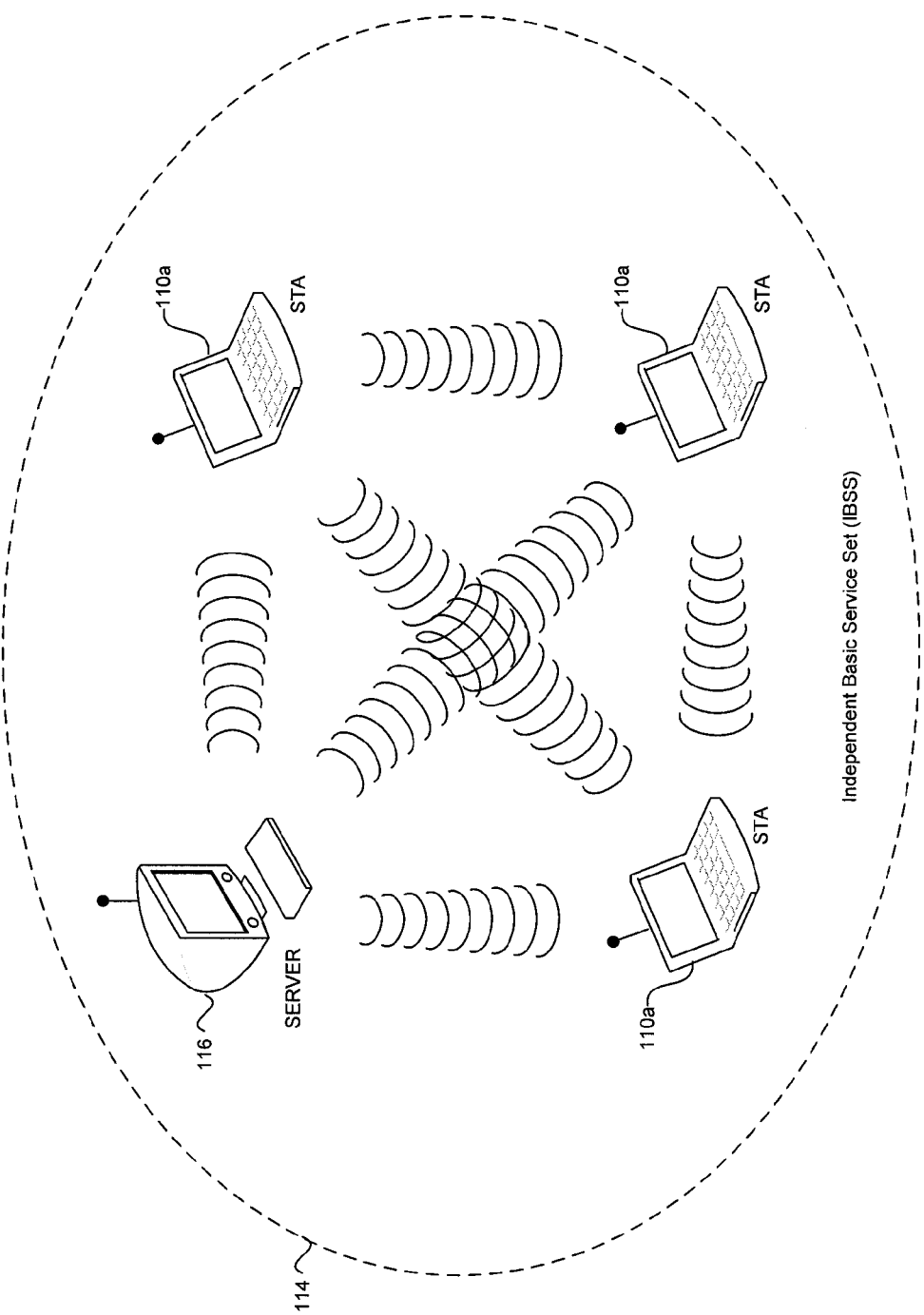
FIG. 1B is a block diagram illustrating an exemplary WLAN ad hoc or peer-to-peer network comprising an integrated basic service set (IBSS) for communicating video content to a wireless device, in accordance with an embodiment of the invention.

FIG. 1B is a block diagram illustrating an exemplary WLAN ad hoc or peer-to-peer network comprising an integrated basic service set (IBSS) for communicating video content to a wireless device, in accordance with an embodiment of the invention. Referring to FIG. 1B, there is shown an IBSS 114 associated with a WLAN ad hoc network corresponding to a WiFi ad hoc mode of operation, for example. The IBSS 114 may comprise a server 116 and a plurality of wireless devices or stations 110a. In this mode of operation, the wireless stations 110a and the server 116 may directly communicate with each other. In some applications, such as in VoIP, the packets communicated may comprise audio and/or voice content. In other applications, such as in multimedia applications, the packets communicated may comprise audio/voice content, video content, and/or data content, for example. In this regard, the server 116 and/or the plurality of wireless stations 110a may enable processing, for example, decoding and/or encoding, of packets comprising at least one type of information content. The server 116 and/or the plurality of wireless stations 110a may enable indicating to each other when a packet and/or stream of packets comprises either audio/voice content, video content, and/or data content by, for example, setting at least one flag in a preamble or header of the packet or by indicating priorities associated with quality of service requirements for voice and/or video applications. Notwithstanding the description of the IBSS 114 in FIG. 1B, other embodiments of the invention may be utilized where the IBSS 114 may comprise at least one of the exemplary wireless stations 110a, 110b, 110c, and 110d in FIG. 1A, for example.

Figure 2A:
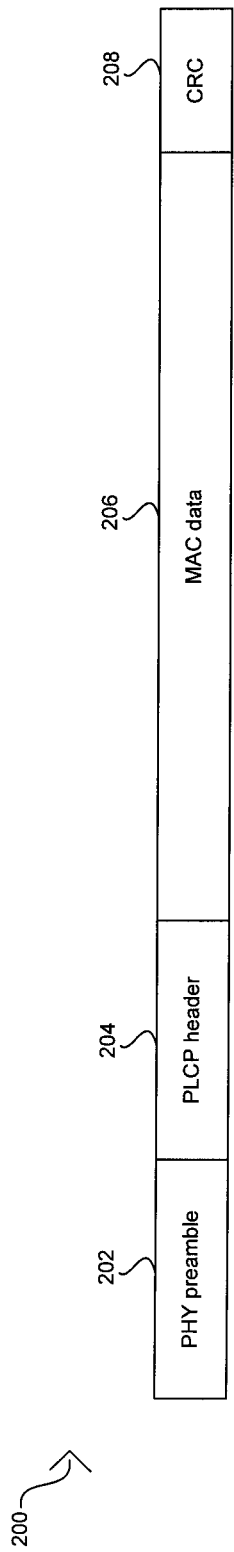
FIG. 2A is a diagram illustrating an exemplary WLAN frame format, in accordance with an embodiment of the invention.

FIG. 2A is a diagram illustrating an exemplary WLAN frame format, in accordance with an embodiment of the invention. Referring to FIG. 2A, there is shown a frame 200 that may be utilized in WLAN applications. For high-rate WLAN applications, such as WiFi applications, information communicated via the frame 200 may be utilized for operations associated with the physical layer (PHY) and the medium access control (MAC) sublayer of the data link layer. For example, the frame 200 may be utilized in control operations to indicate a request to send (RTS) information, to indicate a clear to send (CTS) information, and/or to indicate an acknowledgment (ACK) to a sender. Moreover, the frame 200 may be utilized to communicate information such as data, voice, and/or video content, for example. In some instances, portions of the frame 200 may be utilized to indicate the content type of the information within the frame 200.

The frame 200 may comprise a PHY preamble 202, a physical layer convergence protocol (PLCP) header 204, a MAC data 206, and a cyclic redundancy check field 208. The PHY preamble 202 may comprise information that enables synchronization and/or indicates the start of a frame. The PLCP header 204 may comprise transmission information and/or information regarding contents in the MAC data 206. The PLCP is a portion of the physical layer, another being the physical medium dependent (PMD) sublayer, that presents a common interface for the MAC sublayer and that enables carrier sense and clear channel assessment. The MAC data 206 may comprise information regarding the MAC sublayer such as information for the support of both infrastructure and ad hoc operation modes and/or for the support of packet fragmentation when large packets of data need sending, for example. The CRC field 208 may comprise information for error detection associated with the frame 200.

Figure 2B:
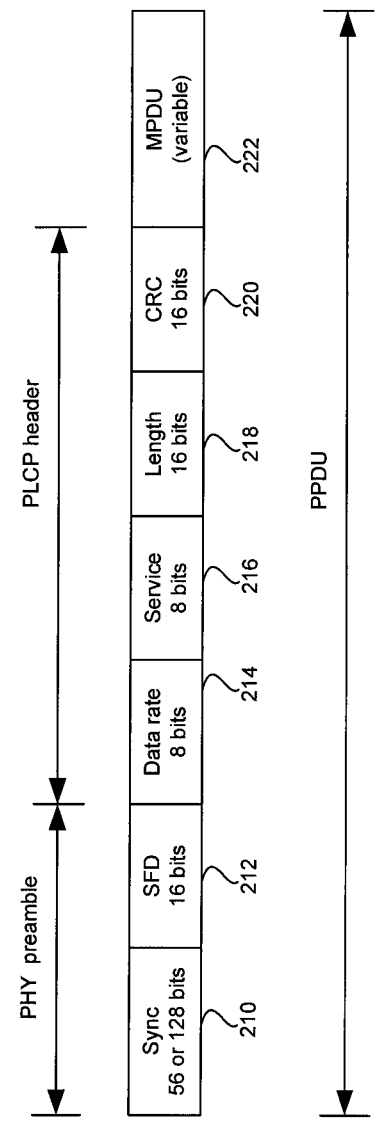
FIG. 2B is a diagram illustrating exemplary preamble and header portions of the WLAN frame format for WiFi applications, in accordance with an embodiment of the invention.

FIG. 2B is a diagram illustrating exemplary preamble and header portions of the WLAN frame format for WiFi applications, in accordance with an embodiment of the invention. Referring to FIG. 2B, there is shown at least a portion of the frame 200 in FIG. 2A that may comprise a synchronization (sync) field 210, a start frame delimiter (SFD) field 212, a data rate (DR) or signal field 214, a service field 216, a length field 218, a CRC field 220, and a MAC sublayer protocol data unit (MPDU) field 222. The sync field 210 and the SFD field 212 may correspond to the PHY preamble 202 in FIG. 2A, for example. The DR field 214, the service field 216, the length field 218, and the CRC field 222 may correspond to the PLCP header 204 in FIG. 2A, for example. The PHY preamble 202, the PLCP header 204, and the MPDU field 222 may correspond to a physical layer protocol data unit (PPDU), for example.

The sync field 210 may comprise 128 scrambled bits for a long preamble or 56 scrambled bits for a short preamble. The SFD field 212 may comprise 16 bits that may be utilized to mark the start of each frame. The DR field 214 may comprise 8 bits that may be utilized to indicate the speed of data transmission. The service field 216 may comprise 8 bits that may be reserved for future use. The length field 218 may comprise 16 bits that may be utilized to indicate the length of the MPDU 222. The CRC field 220 may comprise 16 bits that may be utilized for error detection associated with the PLCP header 204. The MPDU field 222 may comprise a variable number of bits of MAC sublayer information.

Figure 2C:
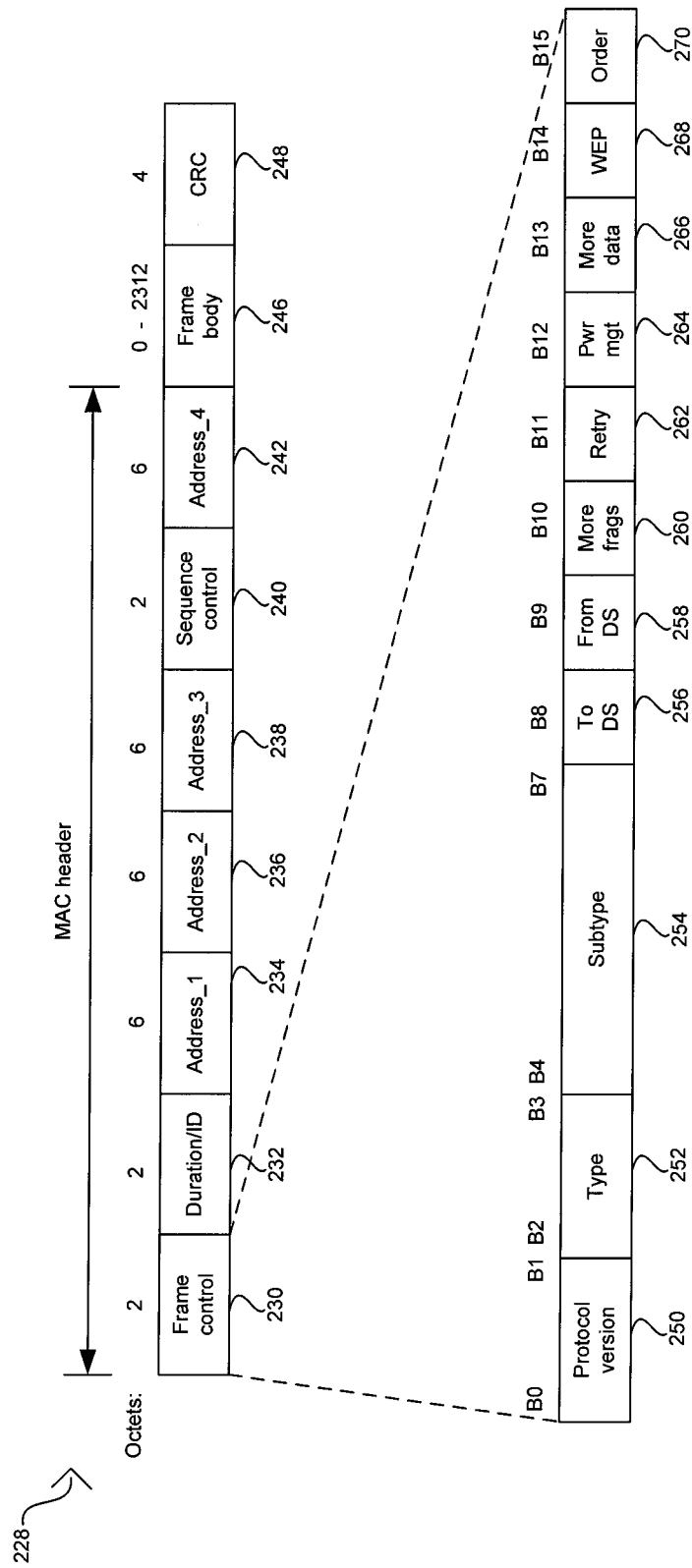
FIG. 2C is a diagram illustrating exemplary MAC sublayer information in a WLAN frame format, in accordance with an embodiment of the invention.

FIG. 2C is a diagram illustrating exemplary MAC sublayer information in a WLAN frame format, in accordance with an embodiment of the invention. Referring to FIG. C, there is shown a portion 228 of the frame 200 in FIG. 2A that may correspond to MAC sublayer information. The portion 228 may comprise a frame control field 230, a duration/ID field 232, a first address (address_1) field 234, a second address (address_2) field 236, a third address (address_3) field 238, a sequence control 240, a fourth address (address_4) field 242, a frame body 246, and a CRC field 248. The frame control field 230, the duration and/or ID field 232, the address_1 field 234, the address_2 field 236, the address_3 field 238, the sequence control 240, and the address_4 field 242 may correspond to a MAC header, for example.

The frame control 230 may comprise a protocol version field 250, a type field 252, a subtype field 254, a to distribution system (toDS) field 256, a from DS (fromDS) field 258, a more fragments (frags) field 260, a retry field 262, a power management field 264, a more data field 266, a wired equivalence privacy encryption (WEP) field 268, and an order field 270. The frame control 230 may comprise 16 bits of information, for example. The protocol version field 250 may comprise two bits that may be invariant in size and placement across following versions of the IEEE 802.11 standard and that may be utilized to recognize future versions of the standard. The type field 252 and the subtype field 254 may comprise two bits and four bits respectively to indicate a specified type and subtype for the frame. For example, the frame may be a management, control, data, and/or reserved type. Data frames, for example, may comprise data, voice, and/or video content that may be communicated to the wireless receiver or station. Associated with each type there may be a plurality of subtypes.

The toDS field 256 may comprise a single bit that may be utilized to indicate when a frame that is addressed to an access point is to be forwarded to the distribution system. The fromDS field 258 may comprise a single bit that may be utilized to indicate when a frame is coming from the distribution system. The more fragments field 260 may comprise a single bit that may be utilized to indicate that there are more fragments belonging to the same frame following the current fragment. The retry field 262 may comprise a single bit that may be utilized to indicate that the current fragment is a retransmission of a previously transmitted fragment. A receiving station may utilize the information in the retry field 262 to recognize duplicate transmissions that may occur when an acknowledgment packet is lost.

The power management field 264 may comprise a single bit that may be utilized to indicate the power management mode that the station will be in after the transmission of the current frame. The information in the power management field 264 may be utilized for stations that may be changing modes from a power save mode to an active mode or vice versa, for example. The more data field 266 may comprise a single bit that may be utilized by an access point to indicate that there are more frames buffered for the station. In this regard, the station may utilize this information to continue polling or changing to an active mode. The WEP field 268 may comprise a single bit that may be utilized to indicate that the frame is encrypted based on the WEP algorithm. The order field 270 may comprise a single bit that may be utilized to indicate that the current frame is being transmitted using the strictly-ordered service class.

Referring back to the portion 228 of the frame 200 in FIG. 2A, the duration/ID field 232 may comprise 16 bits of information that may be utilized to indicate the station ID for power-save poll messages or the duration value for network allocation vector (NAV) calculations for other messages. The address_1 field 234 may comprise 48 bits that may be utilized to indicate the recipient address. The address_2 field 236 may comprise 48 bits that may be utilized to indicate the transmitter address. The address_3 field 238 may comprise 48 bits that may be utilized to indicate a remaining or missing address on a frame. For example, when the fromDS field 258 is set to logic 1, then the contents of the address_3 field 238 may correspond to the original source address. However, when the toDS field 256 is set to logic 1, then the contents of the address_3 field 238 may correspond to the destination address. The address_4 field 242 may comprise 48 bits that may be utilized when a wireless distribution system is utilized and a frame is transmitted from one access point to another. In this instance, both the fromDS field 258 and the toDS field 256 are set to logic 1 and both the original source address and the original destination address are missing.

The sequence control field 240 may comprise 16 bits that may be utilized to represent the order of different fragments belonging to the same frame and to recognize packet duplications. The sequence control field 240 may comprise two subfields, a fragment number and a sequence number, to indicate the frame and the number of the fragment in the frame. The frame body 246 may comprise from 0 up to 18,496 bits of data. In some instances, the data in the frame body 246 may correspond to data, voice, and/or video content, for example. The CRC field 248 may comprise 32 bits that may be utilized for error detection associated with the portion 228 of the frame 200.

Figure 3:
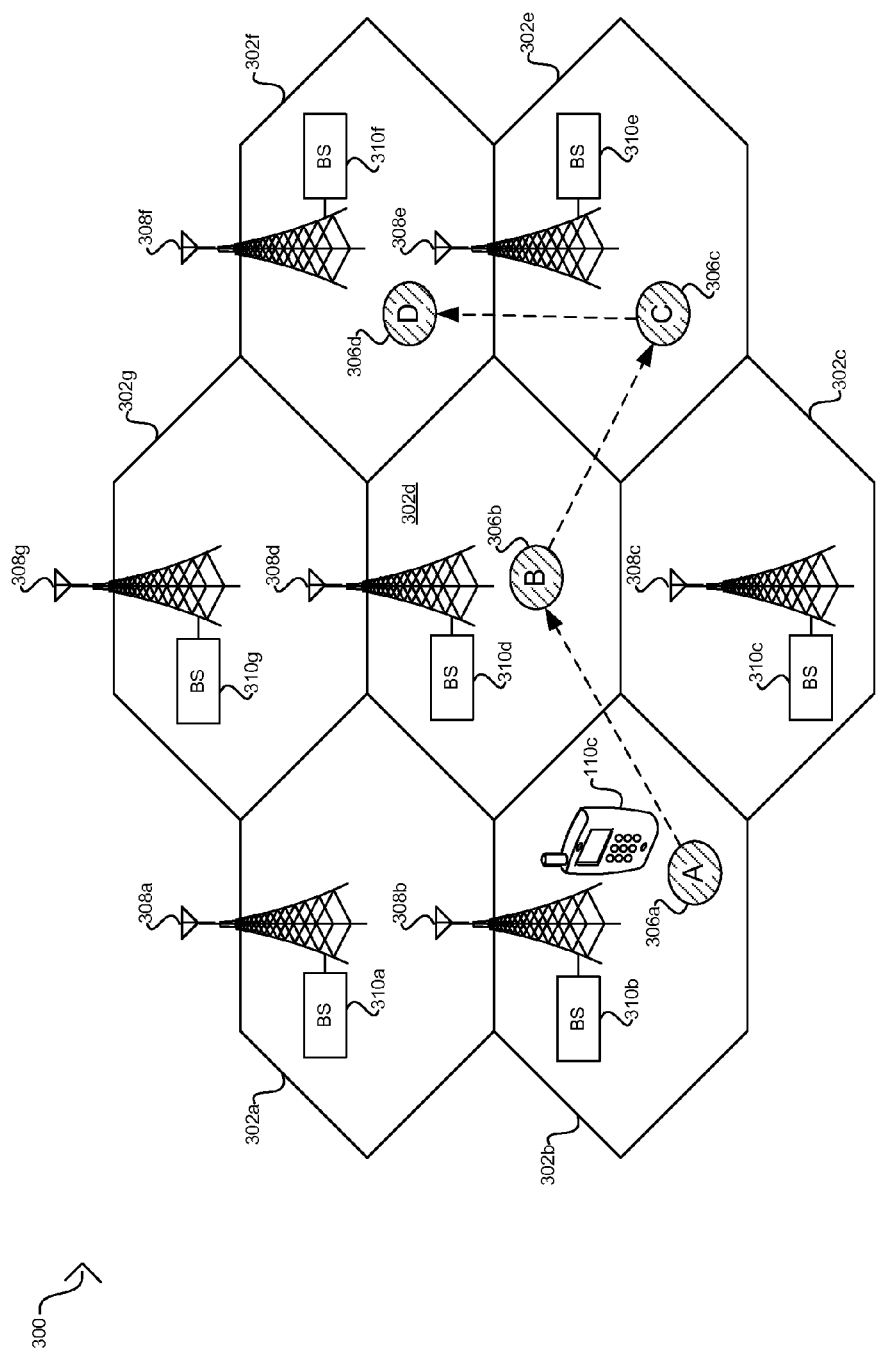
FIG. 3 is a block diagram illustrating an exemplary cellular network, in accordance with an embodiment of the invention.

FIG. 3 is a block diagram illustrating an exemplary cellular network, in accordance with an embodiment of the invention. Referring to FIG. 1A, there is shown a portion of a cellular network 300 that may comprise a first network cell 302a, a second network cell 302b, a third network cell 302c, a fourth network cell 302d, a fifth network cell 302e, a sixth network cell 302f, and a seventh network cell 302g. Also shown in FIG. 3 is a wireless station, such as the wireless station 110c in FIG. 1A, for example. Associated with each of the network cells shown in the portion of the cellular network 100 may be a base station (BS) and a communication antenna. In this regard, there may be base stations 310a, . . . , 310g and communication antennas 308a, . . . , 308g that may be associated with the network cells 302a, . . . , 302g, respectively. In some instances, more than one communication antenna and/or base station may be associated with a network cell.

The base stations 310a, . . . , 310g may comprise suitable logic, circuitry, and/or code that may enable communication with a mobile terminal, such as the wireless station 110c, for example, via at least one of a plurality of cellular technologies. In this regard, the base stations 310a, . . . , 310g may communicate via respective communication antennas 308a, . . . , 308g. The base stations 310a, . . . , 310g may enable processing and/or generation of signals necessary to establish, maintain, and/or terminate communication with a mobile terminal, such as the wireless station 110c, for example. The base stations 310a, . . . , 310g may utilize cellular technologies such as global system for mobile communications (GSM), general packet radio service (GPRS), and/or enhanced data rates for GSM evolution (EDGE) technologies, for example. In this regard, each of the base stations in the network cells may utilize a corresponding GSM carrier frequency with a 200 kHz bandwidth, for example, to communicate with a mobile terminal in the network. The base stations 310a, . . . , 310g may also utilize cellular technologies such as wideband CDMA (WCDMA), universal mobile telecommunications system (UMTS), and/or high speed downlink packet access (HSDPA) technologies, for example.

In HSDPA technologies, for example, a WCDMA channel, the high-speed downlink shared channel (HS-DSCH), may be utilized to communicate between the base stations 310a, . . . , 310g and the wireless station 110c via the respective communication antennas 308a, . . . , 308g. HSDPA technologies may be utilized in a plurality of applications such as Internet browsing services, e-mail services, and/or multimedia services, for example. In this regard, HSDPA technologies may be utilized in applications that enable communication of packets or frames that may comprise audio/voice content, video content, and/or data content, for example, to a wireless station, such as the wireless station 110c in FIG. 1A, for example.

The use of the HS-DSCH downlink channel may enable HSDPA applications to utilize adaptive modulation and coding (AMC), fast packet scheduling at the base station, also referred to as Node B, and/or fast retransmissions from Node B. The use of the HS-DSCH downlink channel may be shared between users or wireless stations that utilize channel-dependent scheduling to take advantage of favorable channel conditions in order to make best use of available radio communication conditions, for example. In this regard, AMC techniques may be utilized to enable a channel quality indicator (CQI) while a hybrid automatic repeat request (HARQ) may be utilized to provide a fine data rate adjustment based on channel conditions.

The communication antennas 308a, . . . , 308g may comprise suitable logic, circuitry, and/or code that may enable transmission and/or reception of signals to and/or from mobile terminals, such as the wireless station 110c, for example. The communication antennas 308a, . . . , 308g may be communicatively coupled to the base stations 310a, . . . , 310g, respectively. The communication antenna 308a may provide cellular communication coverage to mobile terminals in the geographic area or region that corresponds to the network cell 302a. Similarly, communication antennas 308b, . . . , 308g may provide cellular communication coverage to mobile terminals in the geographic areas or regions that correspond to the network cells 302b, . . . , 302g, respectively. In some instances, there may be an overlap in the cellular communication coverage provided to a mobile terminal by adjacent or close network cells.

The wireless station 110c may comprise suitable logic, circuitry, and/or code that may enable communication with the cellular network 100 over a plurality of radio access technologies, such as GSM and/or WCDMA technologies. The GSM technologies supported by the wireless station 110c may be GSM, GPRS, and/or EDGE technologies, for example. The WCDMA technologies supported by the wireless station 110c may be WCDMA, UMTS, and/or HSDPA technologies, for example. The wireless station 110c may comprise cellular integrated circuits for receiving, processing, and/or transmitting cellular channels. The wireless station 110c may enable communication via a plurality of uplink and downlink cellular channels, for example. In HSDPA applications, for example, the wireless station 110c may support the use of the HS-DSCH downlink channel and the corresponding frame formats associated with the use of the HS-DSCH downlink channel. The wireless station 110c may enable processing and/or generation of signals necessary to establish and/or maintain communication with network cells. Moreover, the wireless station 110c may enable receiving of information via a cellular channel regarding the content type of data in received packets or frames.

In operation, the wireless station 110c may be located in an initial position 306a, also labeled location A, and may receive cellular communication coverage from network cell 102b. In this regard, the wireless station 110c may communicate with the BS 310b via the communication antenna 308b utilizing at least one of a plurality of cellular technologies, such as HSDPA technologies, for example. Over time, the user of the wireless station 110c may move from location A to other locations, for example. This is illustrated by moving from position A to a second position 306b, also labeled location B, followed by a move to a third position 306c, also labeled location C, and followed by a move to a final position 306, also labeled location D. Cellular communication coverage may be provided to the wireless station 310c as it moves from locations B through D by the network cells 302d, 302e, and 302f, respectively. In this regard, when HSDPA technologies may be utilized for communication between the wireless station 110c and the base stations in the network cells 302d, 302e, and 302f, the base stations in those networks cells may enable HSDPA operations such as the use of the HS-DSCH downlink channel and associated frame formats, for example.

Figure 4A:
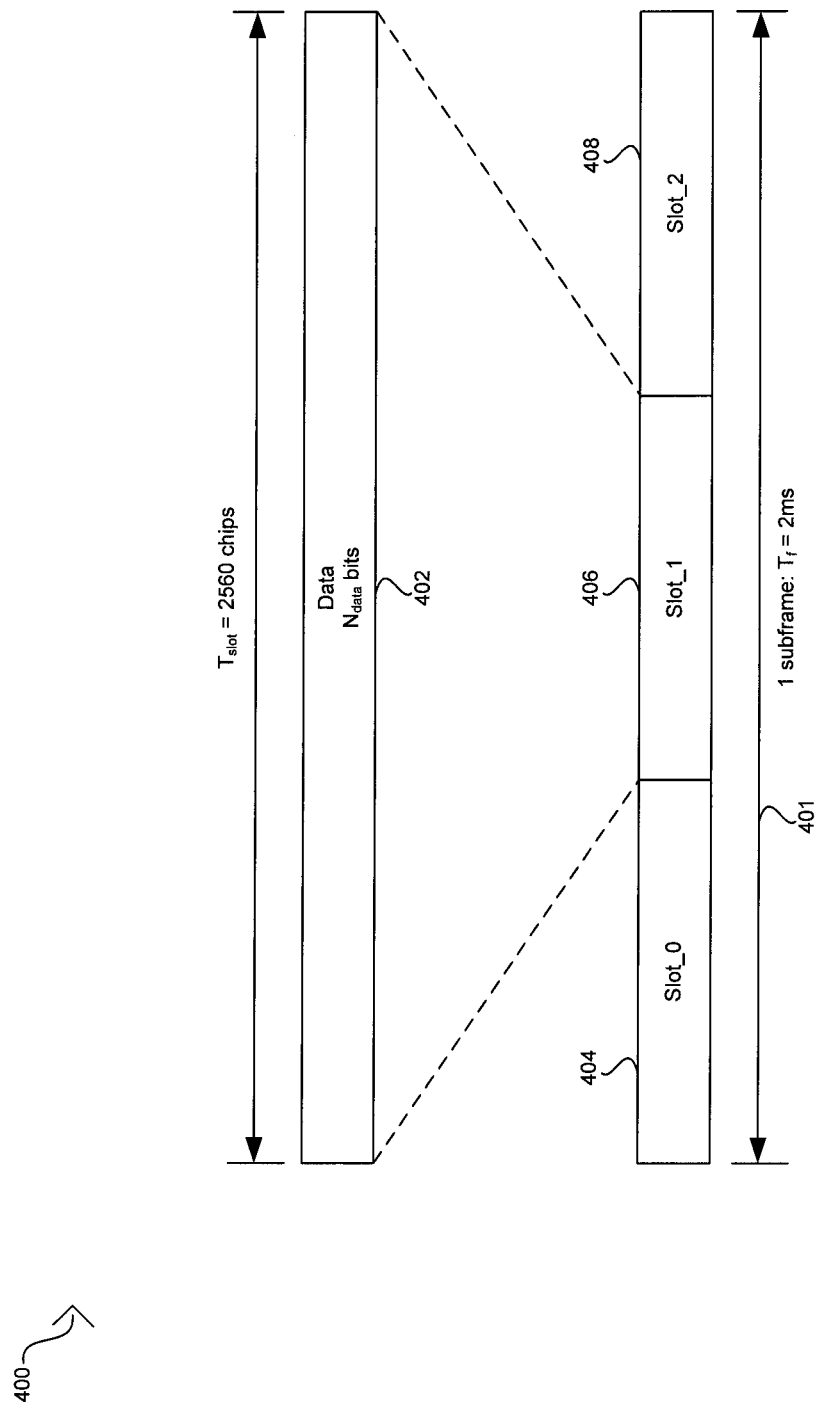
FIG. 4A is a diagram illustrating an exemplary HSDPA downlink frame structure, in accordance with an embodiment of the invention.

FIG. 4A is a diagram illustrating an exemplary HSDPA downlink frame structure, in accordance with an embodiment of the invention. Referring to FIG. 4A, there is shown an HSDPA downlink frame structure 400 that may be utilized in an HS-DSCH downlink channel for communicating packets of information from a cellular transmission node to a wireless station or device. The downlink frame structure 400 may comprise a subframe 401 that may have a time duration, $T_r$, of approximately 2 ms, for example. The subframe 401 may comprise three slots such as slot_0 404, slot_1 406, and slot_2 408, for example.

The slot_0 404, slot_1 406, and slot_2 408 may be utilized for communicating downlink information in a high-speed shared control channel (HS-SCCH) or in a high-speed physical downlink shared channel (HS-PDSCH), for example. The slot data 402 may correspond to an exemplary slot in the subframe 401 that may have a time duration, $T_{slot}$, of approximately 2560 chips. In HS-PDSCH applications, the slot data 402 may comprise $N_{data}$ bits of user specific information from the HS-DSCH downlink transport channel. The user specific information in the slot data 402 may comprise data, voice, and/or video content, for example. In this regard, the user specific information may comprise information indicating the content type in the slot data 402. In HS-SCCH applications, the slot data 402 may comprise $N_{data}$ bits of signaling information related to the HS-DSCH downlink transport channel such as channelization code set, modulation scheme, transport block size, HARQ process information, redundancy and constellation version, and/or new data indicator, for example.

Figure 4B:
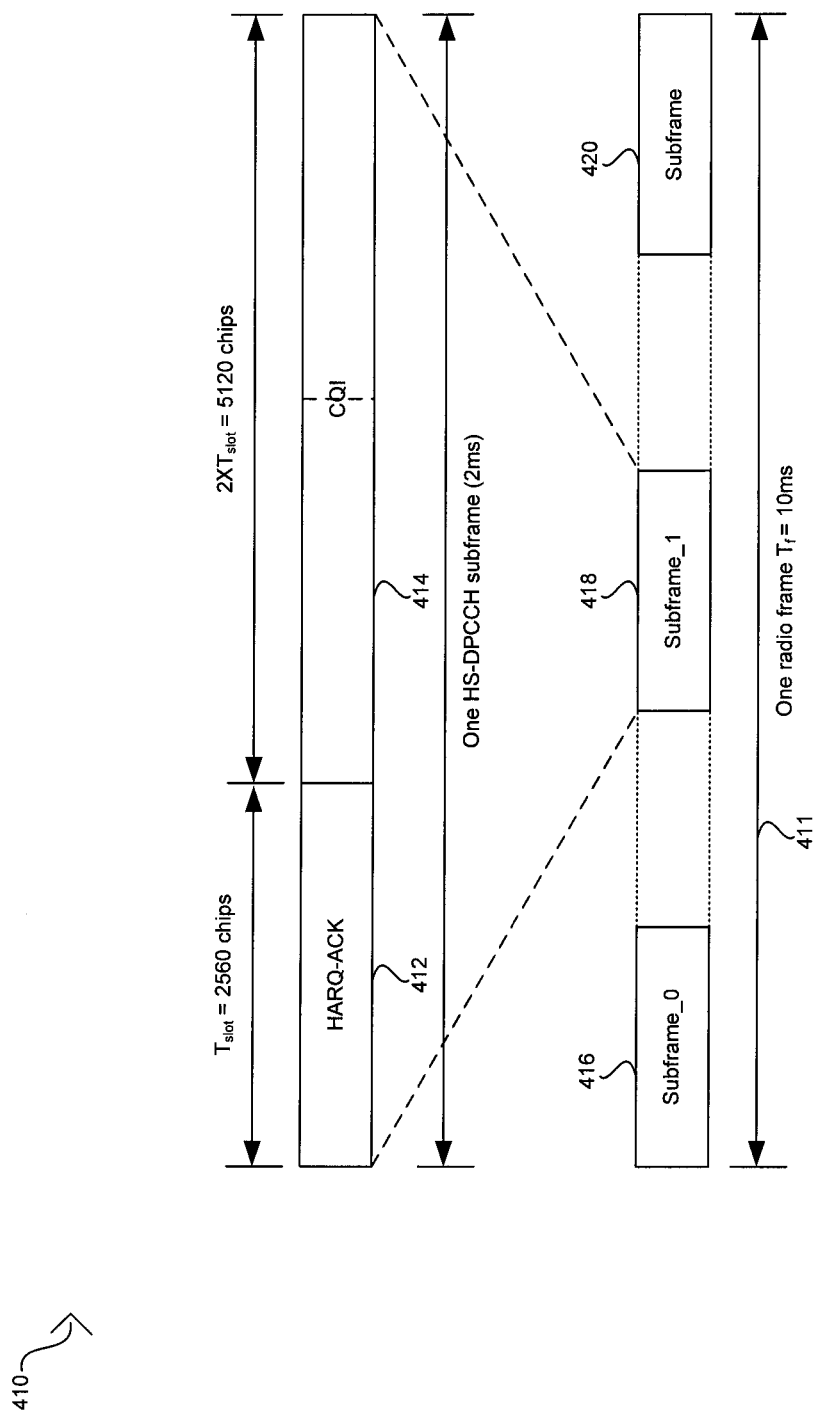
FIG. 4B is a diagram illustrating an exemplary HSDPA uplink frame structure, in accordance with an embodiment of the invention.

FIG. 4B is a diagram illustrating an exemplary HSDPA uplink frame structure, in accordance with an embodiment of the invention. Referring to FIG. 4B, there is shown an HSDPA uplink frame structure 410 that may be utilized in an HS-DSCH downlink channel for communicating packets of information from a wireless station or device to a cellular transmission node. The uplink frame structure 410 may comprise a radio frame 411 that may have a time duration, $T_r$, of approximately 10 ms, for example. The radio frame 411 may comprise five subframes such as subframe_0 416, . . . , subframe_1 418, . . . , and subframe_4 420, for example.

The subframe_0 416, . . . , subframe_1 418, . . . , and subframe_4 420 may be utilized for communicating uplink information in a high-speed dedicated physical channel (HS-DPCCH), for example. The subframe_1 418 may comprise a HARQ-ACK portion 412 and a CQI portion 414 and may have a time duration of approximately 2 ms. In this regard, the HARQ-ACK portion 412 may have a time duration, $T_{slot}$, of approximately 2560 chips, and the CQI portion 414 may have a time duration, $2 \times T_{slot}$, of approximately 5120 chips.

Figure 4C:
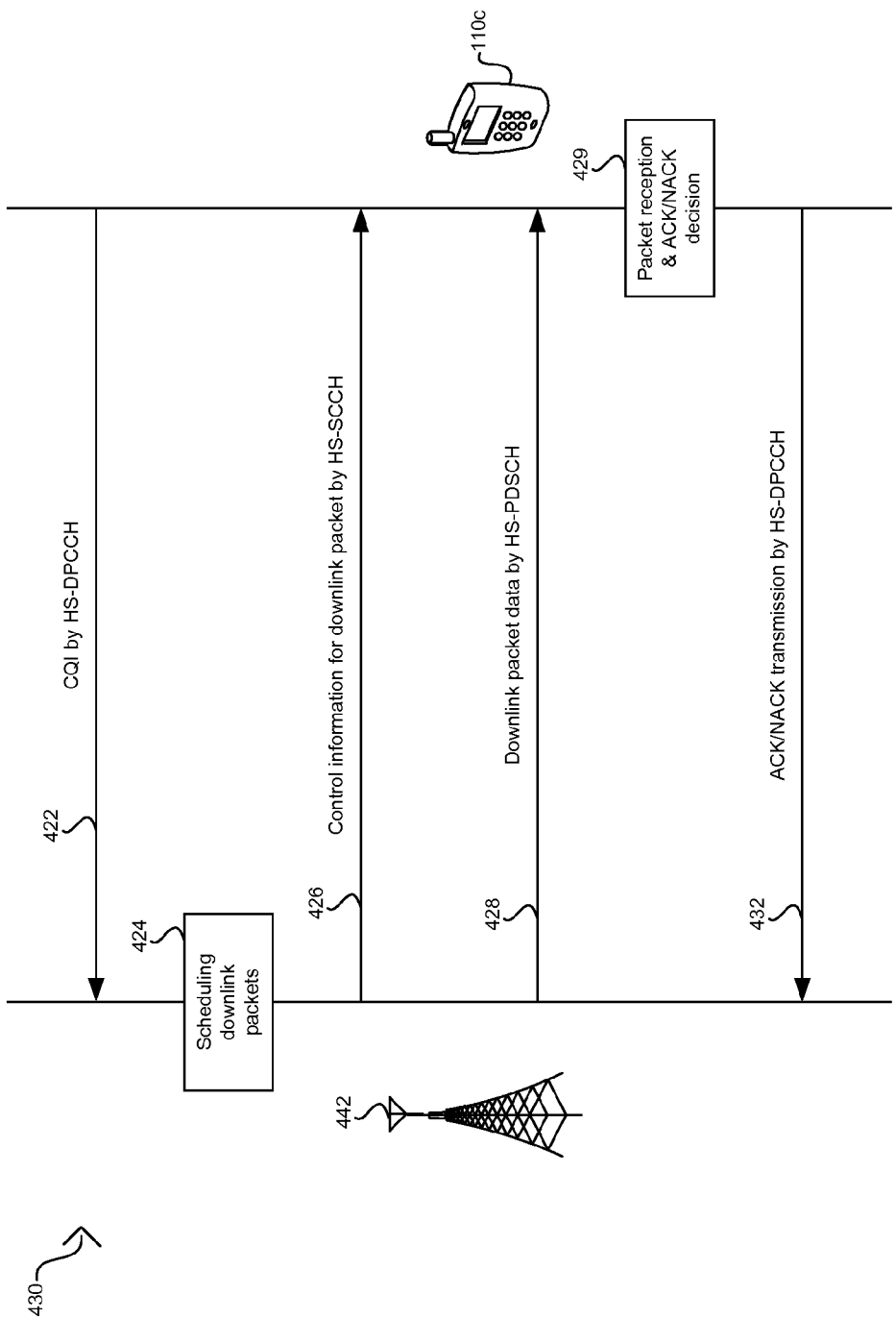
FIG. 4C is a diagram illustrating exemplary steps in HSDPA handshaking, in accordance with an embodiment of the invention.

FIG. 4C is a diagram illustrating exemplary steps in HSDPA handshaking, in accordance with an embodiment of the invention. Referring to FIG. 4C, there is shown a handshaking diagram 430 comprising step 422 in which a wireless station, such as the wireless station 110c in FIG. 1A, for example, may periodically transmit CQI information to a cellular transmission node 442 via packets that utilize the HSDPA uplink frame structure 410 in the HS-DPCCH. The cellular transmission node 442 may correspond to a base station and communication antenna such as those described in FIG. 3, for example. In step 424, the cellular transmission node 442 may perform scheduling of downlink packets to the wireless station. In step 426, the transmission node 442 may communicate control information to the wireless station via packets that utilize the HSDPA downlink frame structure 400 in the HS-SCCH. In this regard, the cellular transmission node 442 may indicate to the wireless station that new information, such as data, voice, and/or video content, for example, is to be transmitted. In step 428, the cellular transmission node 442 may communicate information, such as data, voice, and/or video content, for example, to the wireless station via packets that utilize the HSDPA downlink frame structure 400 in the HS-PDSCH. The information provided to the wireless station may comprise information indicating the content type in the transmitted packet. In step 429, the wireless station may receive the transmitted packet from the cellular transmission node 442 and may determine whether to acknowledge (ACK) the reception of the packet or not to acknowledge (NACK) the reception of the packet to the cellular transmission node 442. In step 432, the wireless station may communicate the ACK or NACK decision to the cellular transmission node 442 via packets that utilize the HSDPA uplink frame structure 410 in the HS-DPCCH.

Figure 5:
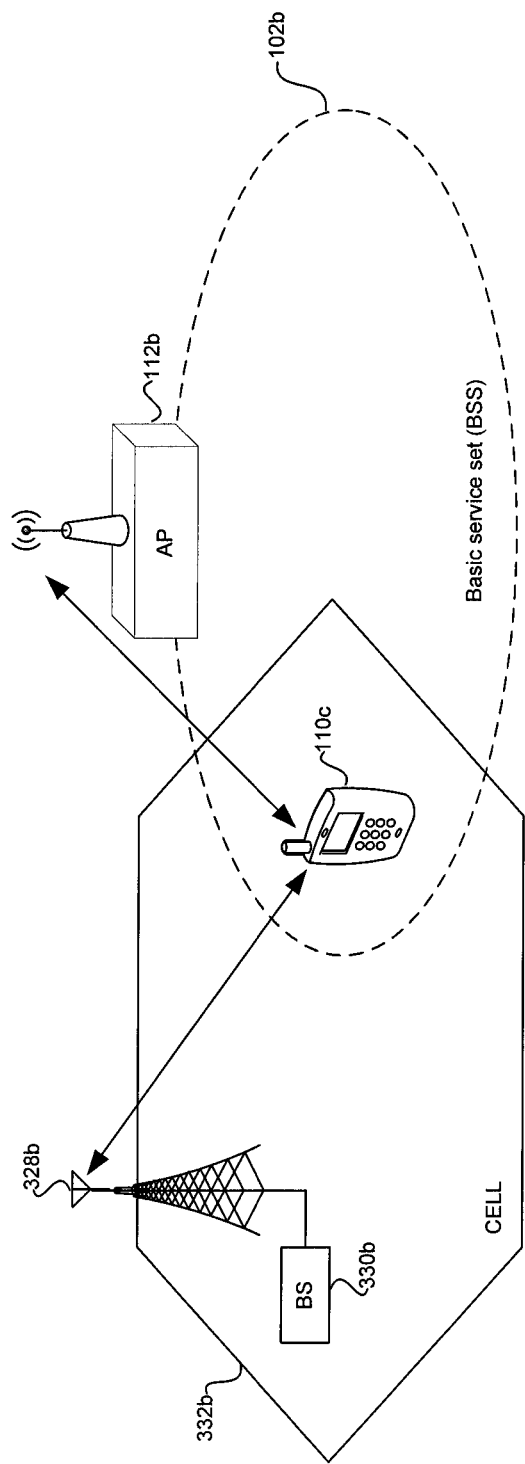
FIG. 5 is a diagram illustrating exemplary cellular and WLAN networks for communicating video content to a wireless device, in accordance with an embodiment of the invention.

FIG. 5 is a diagram illustrating exemplary cellular and WLAN networks for communicating video content to a wireless device, in accordance with an embodiment of the invention. Referring to FIG. 5, there is shown a network cell 332b associated with the cellular network 300 in FIG. 3, a wireless station 110c, and a basic service set 102b associated with the WLAN infrastructure network 100 in FIG. 1A. The network cell 332b may comprise a communication antenna 328b and a base station 330b as illustrated in FIG. 3. The basic service set 102b may comprise an access point 112b as illustrated in FIG. 1A.

The region of coverage of the network cell 332b and the basic service station 102b may overlap, thereby enabling the user of the wireless station 110c to communicate with either a cellular network or with a WLAN network. The wireless station 110c may be enabled to communicate with both networks concurrently, for example. The wireless station 110c may receive voice, data, and/or video content from the cellular network associated with the network cell 332b or from the WLAN network associated with the basic service set 102b. In HSDPA cellular applications, the wireless station 110c may receive an indication from the network cell 332b via, for example, the HS-DSCH downlink channel, regarding the content type of the information communicated to the wireless station 110c. In WLAN applications, the wireless station 110c may receive an indication from the AP 112b via, for example, the frame 200 in FIG. 2A, regarding the content type of the information communicated to the wireless station 110c.

Figure 6:
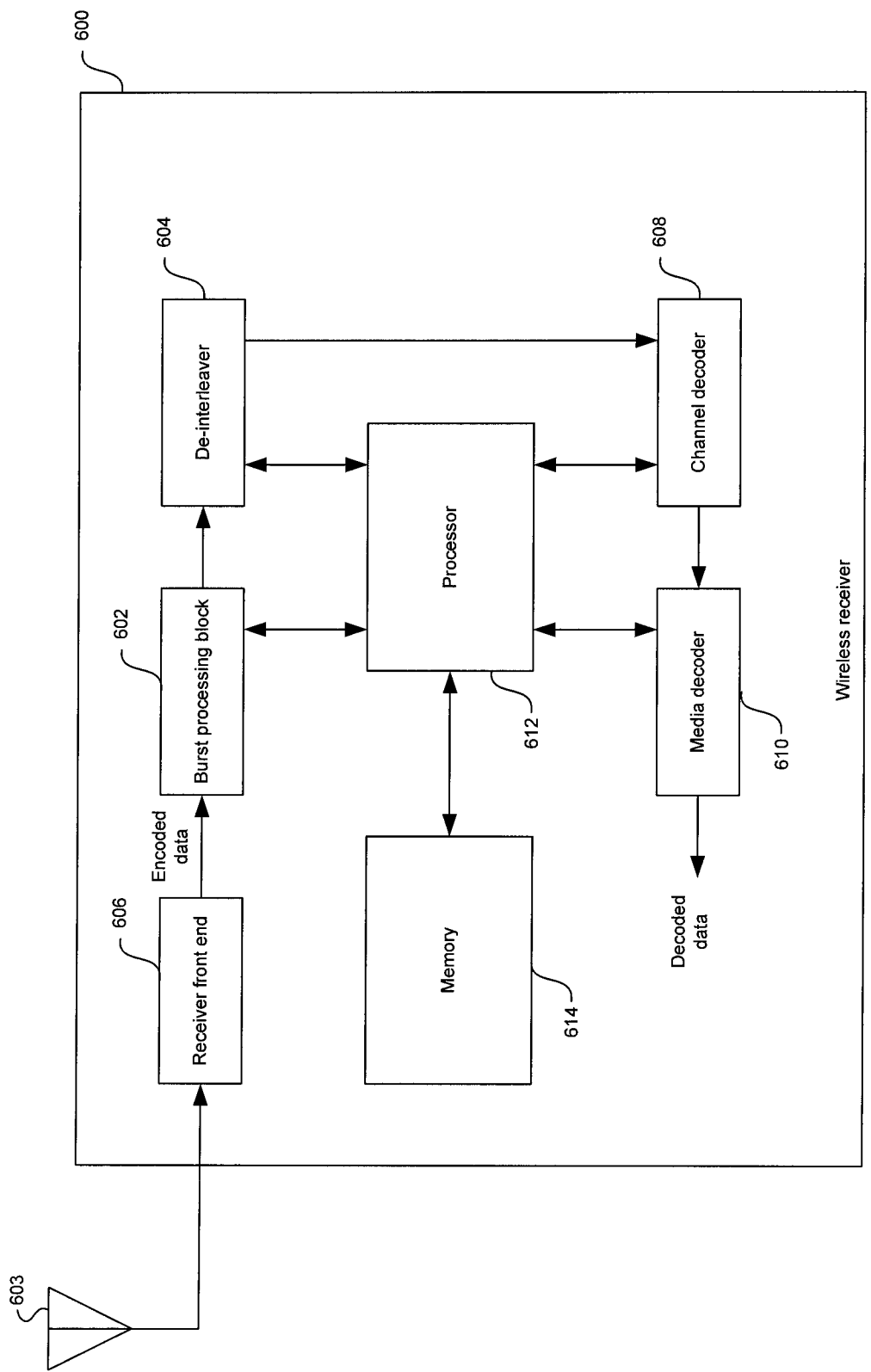
FIG. 6 is a block diagram illustrating a wireless receiver that may be utilized in a WLAN network or a cellular network, in accordance with an embodiment of the invention.

FIG. 6 is a block diagram illustrating a wireless receiver that may be utilized in a WLAN network or a cellular network, in accordance with an embodiment of the invention. Referring to FIG. 6, there is shown a wireless receiver 600 that may correspond to a portion of a wireless station, such as the wireless station 110c, for example, that may be utilized in cellular and/or WLAN networks for receiving voice, data, and/or video content. The wireless receiver 600 may comprise a receiver front end 606, a processor 612, a memory 614, a burst process block 602, a de-interleaver 604, a channel decoder 608, and a media decoder 610. The wireless receiver 600 may support more than one communication protocol. For example, the wireless receiver 600 may support at least one cellular communication protocol, such as HSDPA, in addition to WLAN communication protocol. The wireless receiver 600 may support voice communication, such as VoIP communication, via the WLAN network, for example.

The wireless receiver 600 may comprise suitable logic, circuitry, and/or code that may enable the processing and decoding of received signals. In some instances, the received signals may be, for example, interdependent signals or signals with memory. In this regard, the wireless receiver 600 may utilize redundancy to decode interdependent signals such as signals that comprise convolutional encoded data, for example. The decoding of interdependent signals may be referred to as redundancy-based decoding. The U.S. application Ser. No. 11/189,509 filed on Jul. 26, 2005, discloses a method and system for decoding video, voice, and/or speech data using redundancy, and is hereby incorporated herein by reference in its entirety. Moreover, the wireless receiver 600 may enable the utilization of redundancy to decode interdependent signals of a particular type of information content. For example, the wireless receiver 600 may enable redundancy-based decoding of audio/voice content while applying standard decoding to other type of information content such as data, for example. Similarly, the wireless receiver 600 may enable redundancy-based decoding of video content while applying standard decoding to data and/or voice content, for example.

Redundancy-based decoding algorithms may utilize redundancy and physical constraints embedded in video, voice, and/or speech data. For certain data formats, for example, the inherent redundancy of the physical constraints may result from the packaging of the data and the generation of a redundancy verification parameter, such as a cyclic redundancy check (CRC), for the packaged data. For speech applications, for example, physical constraints may include gain continuity and smoothness or consistency between consecutive inter-frames or intra-frames, pitch continuity in voice inter-frames or intra-frames, and/or consistency of line spectral frequency (LSF) parameters that may be utilized to represent a spectral envelope.

The wireless receiver 600 may be enabled to perform a burst process (BP) operation and a frame process (FP) operation when processing the received signals. In this regard, the burst process block 602 may be utilized to perform the BP operation while the channel decoder 608 and the media decoder 610 may be utilized to perform the FP operation, for example. The wireless receiver 600 may also enable a multilayer approach for improving the decoding of received signals. In this regard, results obtained in the frame process operation may be utilized to improve the performance of the burst process operation. The multilayer approach performed by the wireless receiver 100 may be compatible with a plurality of modulation standards, for example. The U.S. application Ser. No. 11 11/189,634 filed on Jul. 26, 2005, discloses a method and system for improving reception in wired and wireless receivers through redundancy and iterative processing, and is hereby incorporated herein by reference in its entirety.

The receiver front end 606 may comprise suitable logic, circuitry, and/or code that may enable receiving bit sequences from the antenna 603 and processing the received bit sequences for further processing by the burst process block 602. The receiver front end 606 may enable analog and/or digital processing of the data received from the antenna 603. In this regard, the receiver front end 606 may generate digitized baseband samples of the data received via the antenna 603.

The burst process block 602 may comprise suitable logic, circuitry, and/or code that may enable performing a burst process portion of a decoding operation of the wireless receiver 600. The burst process block 602 may perform burst process operations for redundancy-based decoding, for example. The burst process block 602 may comprise, for example, a channel estimation operation and a channel equalization operation. Results from the channel estimation operation may be utilized by the channel equalization operation to generate a plurality of data bursts based on a maximum-likelihood sequence estimation (MLSE) operation, for example. The output of the burst process block 602 may be transferred to the de-interleaver 604. The de-interleaver 604 may comprise suitable logic, circuitry, and/or code that may enable the multiplexing of bits from a plurality of data bursts received from the burst process block 602 to form the frame inputs for the frame process operation. Interleaving may be utilized to reduce the effect of channel fading distortion, for example.

The channel decoder 608 may comprise suitable logic, circuitry, and/or code that may enable decoding of the bit sequences in the input frames received from the de-interleaver 604. The channel decoder 608 may utilize the Viterbi algorithm during a Viterbi operation to improve the decoding of the input frames. The media decoder 610 may comprise suitable logic, circuitry, and/or code that may enable performing content specific processing operations on the results of the channel decoder 608 for specified applications. Some of these applications may be video applications such as MPEG-4, enhanced full-rate (EFR) or adaptive multi-rate (AMR) speech coders used in global system for mobile (GSM) communications, and/or MP3, for example. In this regard, the media decoder 610 may be implemented as a video decoder, for video applications, or a voice decoder (vocoder), for voice applications. In this regard, the media decoder 610 may provide support for a plurality of specified applications.

The processor 612 may comprise suitable logic, circuitry, and/or code that may enable performing computations and/or management operations. The processor 612 may also communicate and/or control at least a portion of the operations of the burst process block 602, the de-interleaver 604, the channel decoder 608 and the media decoder 610. The memory 614 may comprise suitable logic, circuitry, and/or code that may enable storage of data and/or control information. The memory 614 may store information that may be utilized and/or that may be generated by the burst process block 602, the de-interleaver 604, the channel decoder 608 and the media decoder 610. In this regard, information may be transferred to and from the memory 614 via the processor 612, for example.

The channel decoder 608 and the media decoder 610 may perform the frame process operation of the wireless receiver 600. In this regard, a standard approach for decoding convolutional encoded data is to find the maximum-likelihood sequence estimate (MLSE) for a bit sequence. This may involve searching for a sequence X in which the conditional probability P(X/R) is a maximum, where X is the transmitted sequence and R is the received sequence, by using, for example, the Viterbi algorithm. In some instances, the received signal R may comprise an inherent redundancy as a result of the encoding process by the source. This inherent redundancy may be utilized in the decoding process by developing a MLSE algorithm that may be enabled to meet at least some of the physical constrains of the signals source. The use of physical constraints in the MLSE may be expressed as finding a maximum of the conditional probability P(X/R), where the sequence X meets a set of physical constrains C(X) and the set of physical constrains C(x) may depend on the source type and on the application. In this regard, the source type may be a voice, music and/or a video source, for example.

For certain data formats, for example, the inherent redundancy of the physical constraints may result from the packaging of the data and the generation of a redundancy verification parameter, such as a cyclic redundancy check (CRC), for the packaged data. Moreover, decoding data generated by entropy encoders or variable length coding (VLC) operations may also meet some internal constraints. For example, VLC operations utilize a statistical coding technique where short codewords may be utilized to represent values that occur frequently and long codewords may be utilized to represent values that occur less frequently.

Figure 7:
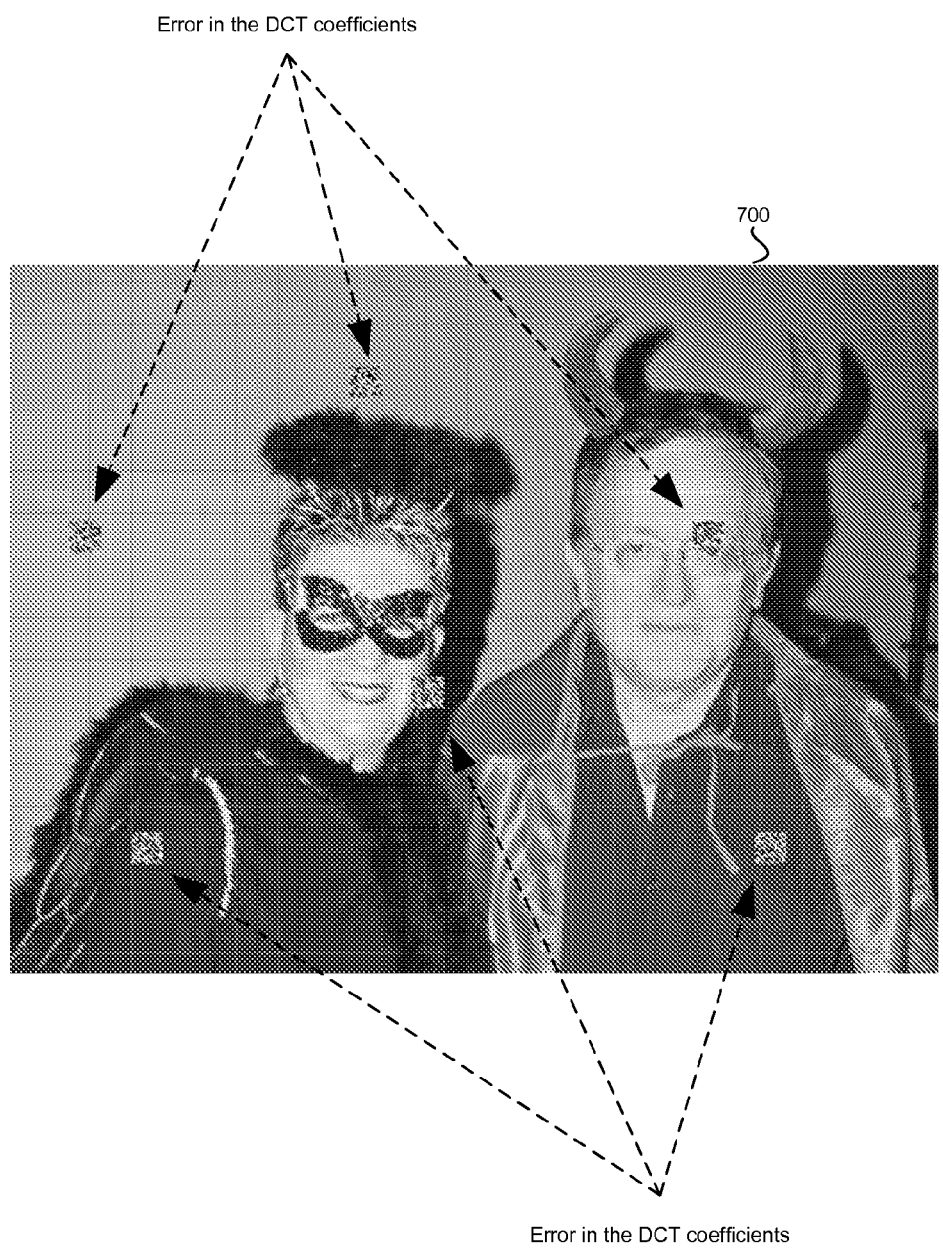
FIG. 7 is a diagram illustrating the effects on a video image of errors in the decoding of DCT coefficients, which may be utilized in association with an embodiment of the invention.

FIG. 7 is a diagram illustrating the effects on a video image of errors in the decoding of DCT coefficients, which may be utilized in association with an embodiment of the invention. Referring to FIG. 7, there is shown a video image 700 that may comprise plurality of decoding errors that may occur in a reconstructed image when there is an error in decoding the DCT coefficients that may be utilized to inverse transform the video image in a video decoder. Applying a physical constraint to the decoding operation of the DCT coefficients in a wireless receiver, such as the wireless receiver 600 in FIG. 6, for example, may enable a reduction in decoding errors. In video applications, where the video information may be partitioned into frames, blocks, and/or macroblocks, typical constraints may include, for example, continuity between the borders of discrete cosine transform (DCT) blocks, continuity of the DC component between neighboring blocks, continuity of low frequencies between blocks, and/or consistency of data that is coded by a VLC operation.

Figure 8:
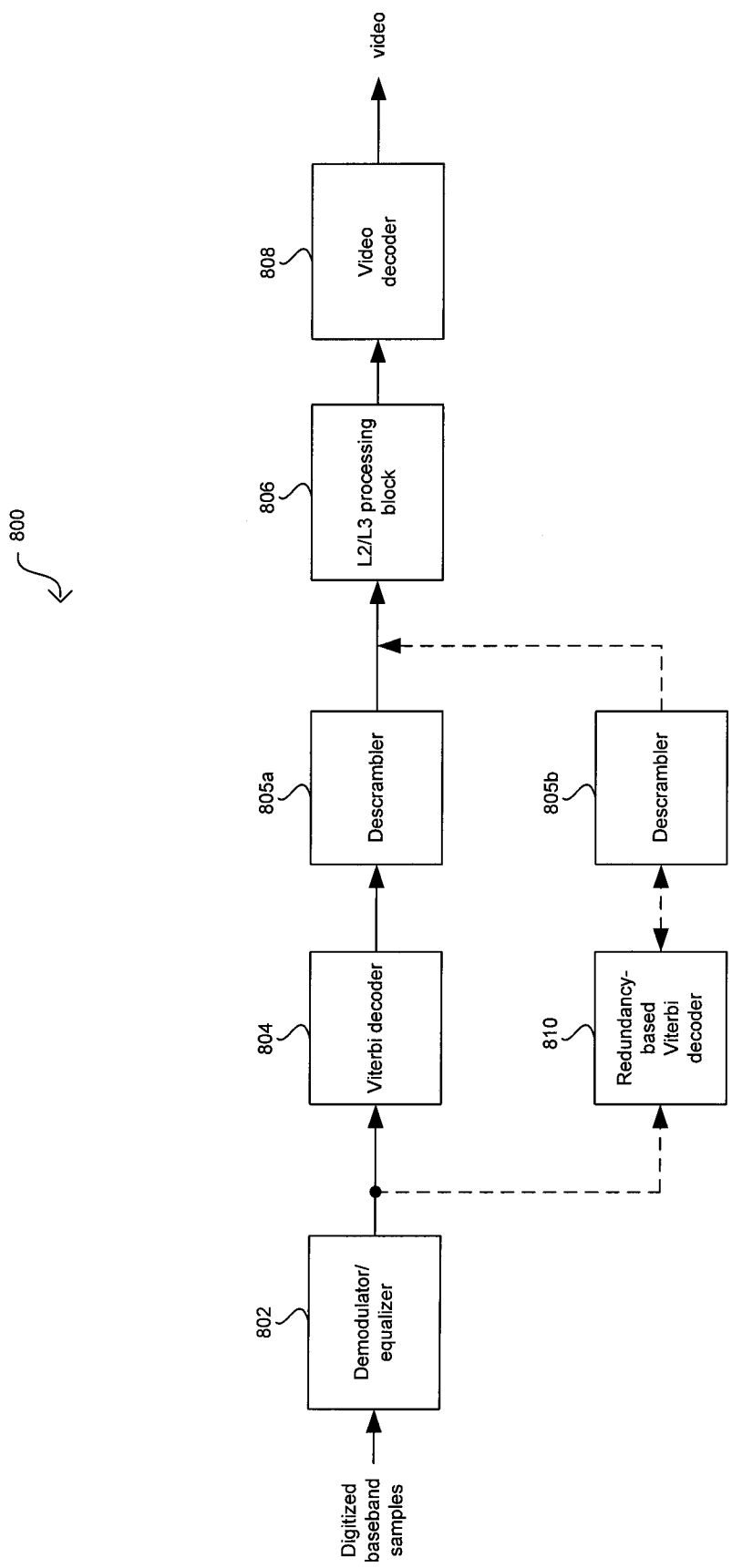
FIG. 8 is a block diagram of an exemplary wireless receiver that may be utilized for video content processing, in accordance with an embodiment of the invention.

FIG. 8 is a block diagram of an exemplary wireless receiver that may be utilized for video content processing, in accordance with an embodiment of the invention. Referring to FIG. 8, there is shown a portion of a wireless receiver 800 that may be utilized to receive video content. In this regard, the wireless receiver 800 may be part of a wireless station that may receive video content from cellular and/or WLAN networks, for example. The wireless receiver 800 may comprise a demodulator/equalizer 802, a Viterbi decoder 804, a redundancy-based Viterbi decoder 810, descramblers 805a and 805b, an OSI layer 2/layer 3 (L2/L3) processing block 806, and a video decoder 808. The wireless receiver 800 may enable decoding of packets comprising video content, for example.

The demodulator/equalizer 802 may comprise suitable logic, circuitry, and/or code that may enable demodulating received digitized baseband samples. The digitized baseband samples may be received from a receiver front end such as the receiver front end 606 in FIG. 6, for example. The demodulator/equalizer 802 may also enable equalizing the signals based on changes that may occur in, for example, the signal channel. The Viterbi decoder 804 may comprise suitable logic, circuitry, and/or code that may enable decoding of convolutional encoded data received from the demodulator/equalizer 802. The Viterbi decoder 804 may decode independent signals or interdependent signals in a similar manner. In this regard, the Viterbi decoder 804 may be referred to as a standard Viterbi decoder that performs content-independent decoding of convolutional encoded data. The descramblers 805a and 805b may comprise suitable logic, circuitry, and/or code that may enable descrambling the decoded data received from the Viterbi decoder 804 and from the redundancy-based Viterbi decoder 810, respectively.

The L2/L3 processing block 806 may comprise suitable logic, circuitry, and/or code that may enable handling layer 2 and/or layer 3 networking information received from the descramblers 805a and 805b. Layer 2 processing may comprise Medium Access Control (MAC) level transport operations, for example. The video decoder 808 may comprise suitable logic, circuitry, and/or code that may enable recreating the originally encoded video content based on analysis and synthesis of data received from the L2/L3 processing block 806.

In some instances, the wireless receiver 800 may utilize a redundancy-based Viterbi decoder 810 instead of the Viterbi decoder 804. In other instances, the wireless receiver 800 may comprise both the Viterbi decoder 804 and the redundancy-based Viterbi decoder 810 and may select between them for decoding the video content. The redundancy-based Viterbi decoder 810 may comprise suitable logic, circuitry, and/or code that may be utilized to perform decoding algorithms that may utilize redundancy and physical constraints embedded in, for example, the video content. The redundancy-based Viterbi decoder 810 may utilize a bi-directional connection with the descrambler 805b, for example, to enable descrambling after iterative steps provided by the redundancy-based Viterbi decoder 810. For video applications, where the video information may be partitioned into frames, blocks, and/or macroblocks, typical constraints may include, for example, continuity between the borders of discrete cosine transform (DCT) blocks, continuity of the DC component between neighboring blocks, continuity of low frequencies between blocks, and/or consistency of data that is coded by a VLC operation.

Figure 9:
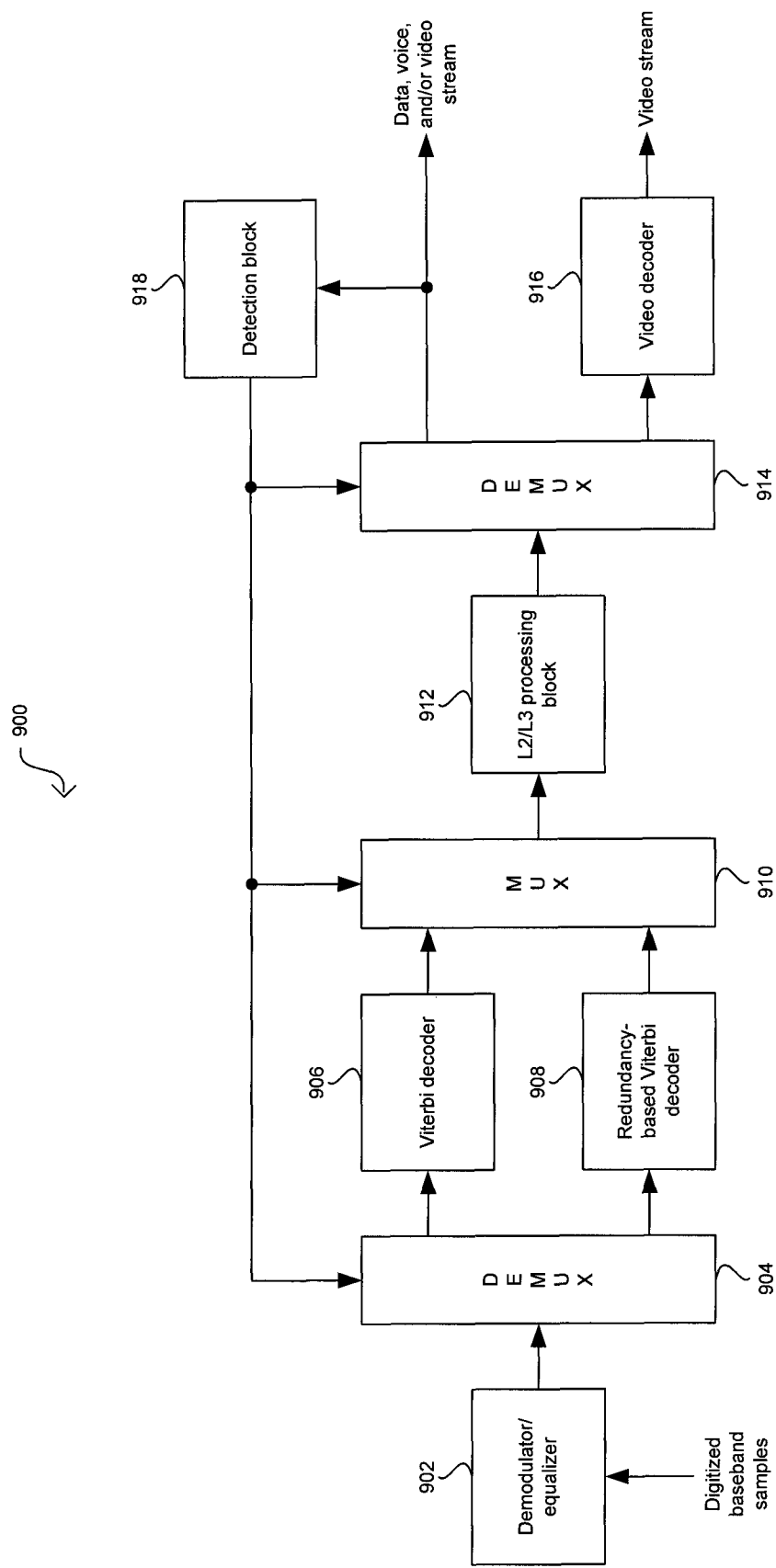
FIG. 9 is a block diagram of a portion of an exemplary wireless receiver that utilizes redundancy-based Viterbi decoding for decoding video content, in accordance with an embodiment of the invention.

FIG. 9 is a block diagram of a portion of an exemplary wireless receiver that utilizes redundancy-based Viterbi decoding for decoding video content, in accordance with an embodiment of the invention. Referring to FIG. 9, there is shown a portion of a wireless receiver 900 that may receive voice, data, and/or video content via a cellular and/or a WLAN network. The wireless receiver 900 may comprise a demodulator/equalizer 902, demultiplexers (DEMUXs) 904 and 914, a multiplexer (MUX) 910, a Viterbi decoder 906, a redundancy-based Viterbi decoder 908, a L2/L3 processing block 912, a video decoder 916, and a detection block 918. The Viterbi decoder 906 may be utilized for general purpose decoding and may be implemented in hardware, for example. The redundancy-based Viterbi decoder 908 may be implemented using a digital signal processor (DSP) or on a processor utilized for handling Medium Access Control (MAC) information, for example. The demodulator/equalizer 902, the Viterbi decoder 906, the redundancy-based Viterbi decoder 908, the L2/L3 processing block 912, and the video decoder 916 shown in FIG. 9 may be the same or substantially similar to corresponding blocks described in FIG. 8.

The DEMUXs 904 and 914 may comprise suitable logic, circuitry, and/or code that may enable selecting one of the output ports for communicating the information provided to the input port. In this regard, at least one signal may be utilized to perform the output port selection in the DEMUXs 904 and 914. The DEMUX 904 may comprise a first output port communicatively coupled to the Viterbi decoder 906 and a second output port communicatively coupled to the redundancy-based Viterbi decoder 908. The DEMUX 914 may comprise a first output port that is communicatively coupled to the detection block 918 and a second output port that is communicatively coupled to the video decoder 916. The first output port of the DEMUX 914 may correspond to a data, voice, and/or video stream while the second output port of the DEMUX 914 may correspond to a video stream.

The MUX 910 may comprise suitable logic, circuitry, and/or code that may enable communicating the information provided to one of the input ports to the output port. In this regard, at least one signal may be utilized to perform the input port selection in the MUX 910. The MUX 910 may comprise a first input port that is communicatively coupled to the Viterbi decoder 906 and a second input port that is communicatively coupled to the redundancy-based Viterbi decoder 908.

The detection block 918 may comprise suitable logic, circuitry, and/or code that may enable detecting video content within a decoded packet. The detection block 918 may generate at least one signal to select the appropriate output port in the DEMUXs 904 and 914 and to select the appropriate input port in the MUX 910 during a normal mode of operation and when video content is detected in a decoded packet.

In some instances, a WLAN access point, such as the AP 112a and AP 112b in FIG. 1A, for example, may enable a flag or a portion of the header of a packet, such as the frame 200 described in FIGS. 2A-2C, to indicate that the packet comprises video content. For example, the IEEE 802.11 protocol supports reserved fields in the packet header for description of content. The access point may enable setting a flag in the reserved fields to indicate that the current packet is a video packet. In this regard, the detection block 918 may detect when a packet comprises video content based on a header flag setting provided by an access point. In WLAN ad hoc or peer-to-peer networks, the server, such as the server 116 in FIG. 1B, may be utilized to enable a flag or a portion of the header of a packet to indicate that the packet comprises video content. Moreover, WLAN is a best effort system where MAC layer enhancements may enable the necessary quality of service for voice and/or video packets by creating priorities for those packets through better bandwidth channels. In this regard, the detection block 918 may detect when a packet or stream of packets comprises video content based on priority information associated with quality of service. In cellular applications, such as HSDPA applications, for example, the cellular transmission node, such as the cellular transmission node 420 in FIG. 4C, may communicate information to the wireless station to indicate that a transmitted packet comprises video content.

In operation, digitized baseband samples corresponding to a received data packet may be processed by the demodulator/equalizer 902. During a normal mode of operation, the output of the demodulator/equalizer 902 may be communicated to the Viterbi decoder 906 via the DEMUX 904. In this regard, the detection block 918 may generate at least one signal to select the output port in the DEMUX 904 that is communicatively coupled to the Viterbi decoder 906. During the normal mode of operation, the decoded information generated by the Viterbi decoder 906 may be communicated to the L2/L3 processing block 912 via the MUX 910. In this regard, the detection block 918 may generate at least one signal to select the input port in the MUX 910 that is communicatively coupled to the Viterbi decoder 906. The L2/L3 processing block 912 may handle the decoded information received from the Viterbi decoder 906. During the normal mode of operation, the output of the L2/L3 processing block 912 may be communicated to the data, voice, and/or video stream and to the detection block 918 via the DEMUX 914. In this regard, the detection block 918 may generate at least one signal to select the appropriate output port of the DEMUX 914. When the detection block 918 detects that at least a portion of the content of the decoded packet is video content, the detection block 918 may generate at least one signal to be sent to the DEMUXs 904 and 914 and to the MUX 910 in order to have packet decoding performed by the redundancy-based Viterbi decoder 908 and then be communicated to the video decoder 916. In some instances, the detection block 918 may be configured to remain in a normal mode of operation and have packets comprising video content be decoded by the Viterbi decoder 906.

The wireless receiver 900 may enable decoding of data, voice, and/or video content via the Viterbi decoder 906 during a normal mode of operation and also enables decoding of video decoding via the redundancy-based Viterbi decoder 906 when the received packets comprise video content. This approach may enable the wireless receiver 900 to provide better decoding performance, and therefore better quality, for video content when the video information is interdependent and therefore contains redundant information that may be utilized as a physical constraint by the redundancy-based Viterbi decoder 908. The wireless receiver 900 may enable detection of video content one packet at a time. For example, the wireless receiver 900 may reset into a normal mode of operation after each packet is decoded. Moreover, the wireless receiver 900 may enable receiving of at least one signal from, for example, an access point (AP) or a cellular transmission node indicating that the packets to be received by the wireless receiver 900 for a determined amount of time comprise video content. In this regard, the wireless receiver 900 may decode a plurality of packets utilizing the redundancy-based Viterbi decoder 908 until the determined amount of time expires and the wireless receiver 900 returns to the normal mode of operation.

In another example, the wireless receiver 900 may receive at least one signal from, for example, an AP or a cellular transmission node indicating that a determined amount of packets to be received by the wireless receiver 900 comprise video content. In this regard, the wireless receiver 900 may decode the determined number of packets that comprise video content utilizing the redundancy-based Viterbi decoder 908 and then return to the normal mode of operation. The detection block 918 may be utilized to generate at least one signal that controls the operations of the DEMUXs 904 and 914 and the MUX 910 in accordance to whether the redundancy-based Viterbi decoder 908 is utilized to decode a determined amount of packets or to decode packets for a determined amount of time.

Figure 10:
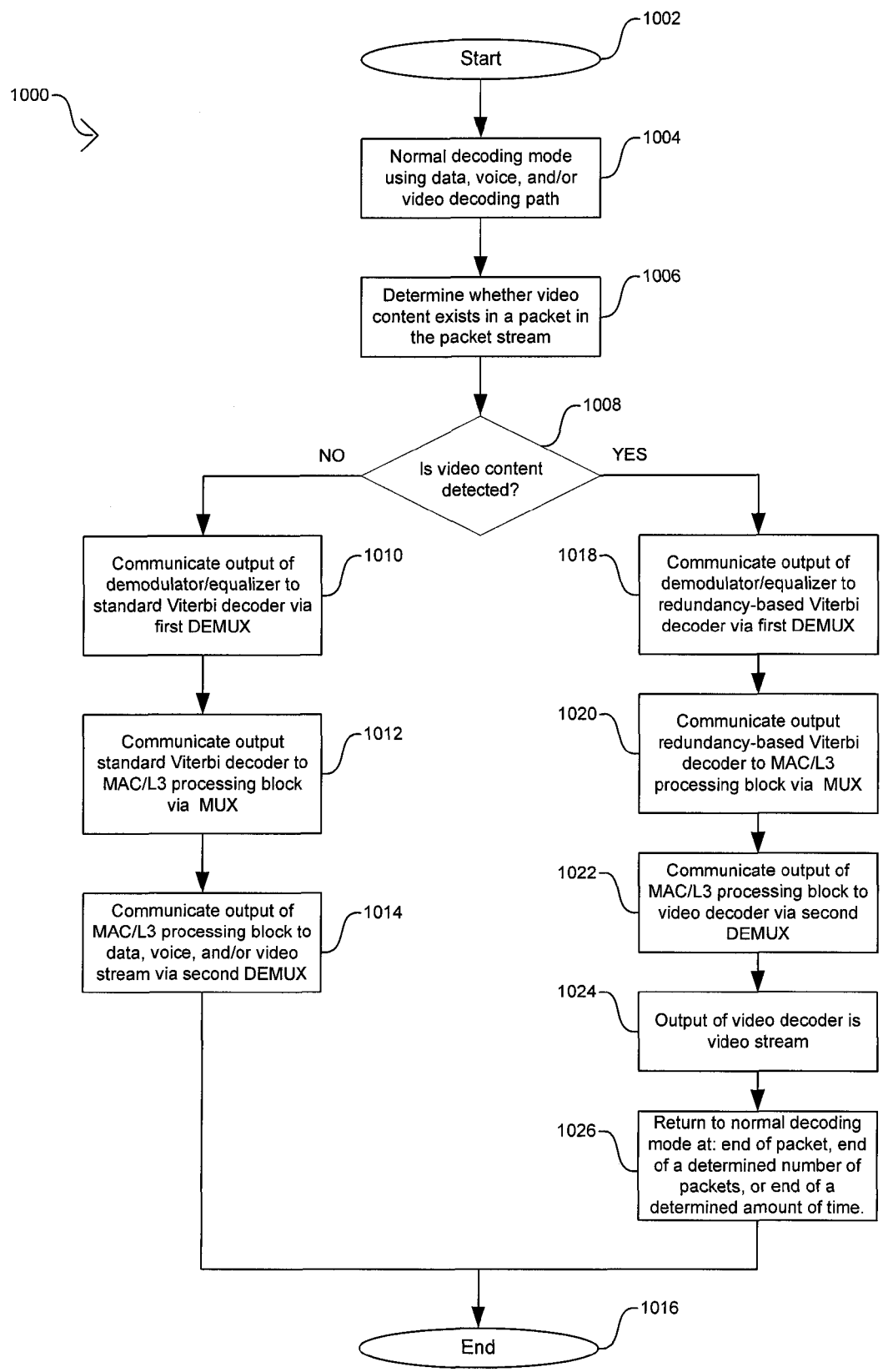
FIG. 10 is a flow diagram illustrating exemplary steps in the operation of the wireless receiver in FIG. 9, in accordance with an embodiment of the invention.

FIG. 10 is a flow diagram illustrating exemplary steps in the operation of the wireless receiver in FIG. 9, in accordance with an embodiment of the invention. Referring to FIG. 10, there is shown a flow chart 1000. After start step 1002, in step 1004, the wireless receiver 900 in FIG. 9 may operate in a normal mode of operation in which the Viterbi decoder 906 is selected for decoding received packets that may comprise voice, data, and/or video content. In step 1006, the detection block 918 may be utilized to detect video content in a receive packet. In step 1008, the detection block 918 may detect when a packet comprises video content based on a header flag setting provided by an access point, a server, or a cellular transmission node, for example. In some instance, the detection block 918 may detect when a packet or stream of packets comprises video content based on priority information associated with quality of service. When the decoded packet does not comprise video content, the process may proceed to step 1010.

In step 1010, the detection block 918 may generate at least one signal that enables the DEMUX 904 to communicate the output of the demodulator/equalizer 902 to the Viterbi decoder 906. In step 1012, the detection block 918 may generate at least one signal that enables the MUX 910 to communicate the output of the Viterbi decoder 906 to the L2/L3 processing block 912. In step 1014, the detection block 918 may generate at least one signal that enables the DEMUX 914 to communicate the output of the L2/L3 processing block 912 to the voice, data, and/or video stream and to the detection block 918. After step 1014, the process may proceed to end step 1016.

Returning to step 1008, when the decoded packet comprises video content, the process may proceed to step 1018. In step 1018, the detection block 918 may generate at least one signal that enables the DEMUX 904 to communicate the output of the demodulator/equalizer 902 to the redundancy-based Viterbi decoder 908. In step 1020, the detection block 918 may generate at least one signal that enables the MUX 910 to communicate the output of the redundancy-based Viterbi decoder 908 to the L2/L3 processing block 912. In step 1022, the detection block 918 may generate at least one signal that enables the DEMUX 914 to communicate the output of the L2/L3 processing block 912 to video decoder 916. In step 1024, the video decoder 916 may generate a video stream. In step 1026, the wireless receiver 900 may return to the normal mode of operation. In this regard, a return to the normal mode of operation may occur at the end of each packet that comprises video content, or at the end of a determined amount of time, or at the end of a determined amount of received packets. After step 1026, the process may proceed to end step 1016.

In one embodiment of the invention, a system for signal processing may comprise circuitry, such as the detection block 918, within a wireless receiver, such as the wireless receiver 900, that enables determining whether a decoded packet comprises video content. If the decoded packet comprises voice content, the circuitry may enable selecting a redundancy-based decoder, such as the redundancy-based Viterbi decoder 908, to perform packet decoding. In some instances, a processor may comprise the redundancy-based decoder. The circuitry may also enable the wireless receiver to select the redundancy-based decoder to decode subsequent packets for a determined amount of time or to decode a determined number of subsequent packets. The circuitry may also enable selecting a non-redundancy-based decoder, such as the Viterbi decoder 906, to decode additional packets after decoding the subsequent packets using the redundancy-based decoder. The circuitry may enable generating at least one signal for selecting of the redundancy-based decoder. In some instances, the circuitry may enable the normal mode of operation that utilizes the non-redundancy-based decoder when packets comprise video content.

The approach described herein may enable a wireless station that may receive voice, audio, data, and/or video content types via cellular and/or WLAN networks to improve the decoding performance of video content by selecting a redundancy-based decoder. Notwithstanding, an embodiment of the invention may utilize other types of networks such as Bluetooth networks, for example.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for signal processing, the method comprising:
  performing by one or more processors and/or circuits in a wireless receiver:
    identifying portions of a multimedia data stream comprising non-video content received by said wireless receiver;
    identifying portions of a multimedia data stream comprising video content received by said wireless receiver;
    enabling a non-redundancy based channel decoder to decode said identified portion of said multimedia data stream comprising non-video content;
    decoding, utilizing said enabled non-redundancy based channel decoder, said identified portion of said multimedia data stream comprising non-video content;
    enabling a redundancy-based channel decoder to decode said identified portion of said multimedia data stream comprising video content; and decoding, utilizing said enabled redundancy-based channel decoder, said identified portion of said multimedia data stream comprising video content, wherein said redundancy-based channel decoding is based on redundancy information in the video content.

2. The method according to claim 1, comprising disabling said redundancy-based channel decoder when decoding portions of said multimedia data stream that do not comprise video content.

3. The method according to claim 1, wherein said wireless receiver is a wireless local area network (WLAN) receiver.

4. The method according to claim 1, wherein said wireless receiver is a cellular receiver.

5. The method according to claim 1, comprising determining whether said identified portion of said multimedia data stream comprises video content based on at least one flag in a preamble of said multimedia data stream.

6. The method according to claim 1, comprising determining whether said identified portion of said multimedia data stream comprises video content based on at least one flag in a reserved field of said multimedia data stream.

7. The method according to claim 1, wherein said redundancy-based channel decoder is a Viterbi decoder.

8. The method according to claim 1, comprising generating at least one signal for said selecting of said redundancy-based channel decoder.

9. A non-transitory computer readable medium having stored thereon, a computer program having at least one code section for signal processing, the at least one code section being executable by a computer for causing the computer to perform steps comprising:
   identifying portions of a multimedia data stream comprising video content received by a wireless receiver;
   identifying portions of a multimedia data stream comprising non-video content received by said wireless receiver;
   enabling a non-redundancy based channel decoder to decode said identified portion of said multimedia data stream comprising non-video content;
   decoding, utilizing said enabled non-redundancy based channel decoder, said identified portion of said multimedia data stream comprising non-video content;
   enabling a redundancy-based channel decoder to decode said identified portion of said multimedia data stream comprising video content; and
   decoding, utilizing said enabled redundancy-based channel decoder, said identified portion of said multimedia data stream comprising video content, wherein said channel decoding is based on redundancy information in the video content.

10. The non-transitory computer readable medium according to claim 9, wherein said at least one code section comprises code for disabling said redundancy-based channel decoder when decoding portions of said multimedia data stream that do not comprise video content.

11. The non-transitory computer readable medium according to claim 9, wherein said wireless receiver is a WLAN receiver.

12. The non-transitory computer readable medium according to claim 9, wherein said wireless receiver is a cellular receiver.

13. The non-transitory computer readable medium according to claim 9, wherein said at least one code section comprises code for determining whether said identified portion of said multimedia data stream comprises video content based on at least one flag in a preamble of said multimedia data stream.

14. The non-transitory computer readable medium according to claim 9, wherein said at least one code section comprises code for determining whether said identified portion of said multimedia data stream comprises video content based on at least one flag in a reserved field of said multimedia data stream.

15. The non-transitory computer readable medium according to claim 9, wherein said redundancy-based channel decoder is a Viterbi decoder.

16. The non-transitory computer readable medium according to claim 9, wherein said at least one code section comprises code for generating at least one signal for said selecting of said redundancy-based channel decoder.

17. A system for signal processing, the system comprising:
   a wireless receiver that enables identifying portions of a multimedia data stream received by said wireless receiver that comprise video content;
   said wireless receiver identifying portions of a multimedia data stream comprising non-video content received by said wireless receiver;
   said wireless receiver enabling a non-redundancy based channel decoder to decode said identified portion of said multimedia data stream comprising non-video content;
   said enabled non-redundancy based channel decoder, said identified portion of said multimedia data stream comprising non-video content;
   said wireless receiver enables a redundancy-based channel decoder for decoding said identified portion of said multimedia data stream comprising video content; and
   said redundancy-based channel decoder enables decoding, based on redundancy information in the video content, said identified portion of said multimedia data stream comprising video content.

18. The system according to claim 17, wherein said wireless receiver enables disabling said redundancy-based channel decoder when decoding portions of said multimedia data stream that do not comprise video content.

19. The system according to claim 17, wherein said wireless receiver is a WLAN receiver.

20. The system according to claim 17, wherein said wireless receiver is a cellular receiver.

21. The system according to claim 17, wherein said wireless receiver enables determining whether said identified portion of said multimedia data stream comprises video content based on at least one flag in a preamble of said multimedia data stream.

22. The system according to claim 17, wherein said wireless receiver enables determining whether said identified portion of said multimedia data stream comprises video content based on at least one flag in a reserved field of said multimedia data stream.

23. The system according to claim 17, wherein said redundancy-based channel decoder is a Viterbi decoder.

24. The system according to claim 17, wherein said wireless receiver enables generating at least one signal for said selecting of said redundancy-based channel decoder.

* * * * *